(12) United States Patent
Sakama

(10) Patent No.: US 8,594,731 B2
(45) Date of Patent: Nov. 26, 2013

(54) RADIO EQUIPMENT CONTROLLER, RADIO EQUIPMENT, AND COMMUNICATION METHOD

(75) Inventor: Tadayuki Sakama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 3 days.

(21) Appl. No.: 13/291,260

(22) Filed: Nov. 8, 2011

(65) Prior Publication Data

US 2012/0052878 A1 Mar. 1, 2012

Related U.S. Application Data

(63) Continuation of application No. PCT/JP2009/059653, filed on May 27, 2009.

(51) Int. Cl.

| H04B 1/38 | (2006.01) |
|---|---|
| H04W 24/00 | (2009.01) |
| H04M 11/04 | (2006.01) |
| H04W 72/00 | (2009.01) |
| H04L 12/28 | (2006.01) |
| H04J 3/00 | (2006.01) |

(52) U.S. Cl.
USPC ..... 455/561; 455/450; 455/456.1; 455/404.2; 370/431; 370/464

(58) Field of Classification Search
USPC ........... 455/424, 550.1, 561, 551, 456.1–457, 455/404.1–404.2, 450; 370/335–336, 370/342–345, 431, 464
See application file for complete search history.

(56) References Cited

U.S. PATENT DOCUMENTS

2007/0270185 A1 11/2007 Yagawa

| 2008/0089689 | A1* | 4/2008 | Sakama | 398/115 |
|---|---|---|---|---|
| 2008/0231203 | A1 | 9/2008 | Budde et al. | |
| 2011/0032910 | A1* | 2/2011 | Aarflot et al. | 370/335 |

FOREIGN PATENT DOCUMENTS

| EP | 1 911 331 | 4/2008 |
|---|---|---|
| JP | 2007-312185 | 11/2007 |
| JP | 2009-503778 | 1/2009 |
| JP | 2009-80455 | 4/2009 |
| WO | 2007/013003 | 2/2007 |

OTHER PUBLICATIONS

International Search Report dated Jul. 14, 2009, from corresponding International Application No. PCT/JP2009/059653.

* cited by examiner

*Primary Examiner* — Vladimir Magloire
*Assistant Examiner* — Michael Mapa
(74) *Attorney, Agent, or Firm* — Katten Muchin Rosenman LLP

(57) ABSTRACT

A division and assignment section of a radio equipment control divides an information region of a frame used for exchanging information with radio equipments connected thereto in a daisy-chain fashion, and assigns the information region after the division to the radio equipments. A transmission section transmits address information for the information region assigned to the radio equipments to the radio equipments. A receiving section of the radio equipment receives a frame from the radio equipment control or the radio equipment. A position recognition section recognizes a connection position of the radio equipment connected in the daisy-chain fashion on the basis of positional information included in the frame received. An acquisition section refers to the frame on the basis of the recognized connection position of the radio equipment, and acquires address information for the information region of the frame used for exchanging information with the radio equipment control.

10 Claims, 19 Drawing Sheets

FIG. 7

| SlowC&M ADDRESS INFORMATION FOR RE 1 | | | | | | | | |
|---|---|---|---|---|---|---|---|---|
| BIT POSITION | 7 | 6 | 5 | 4 | 3 | 2 | 1 | 0 |
| ADDRESS ID (0~FF) | 0 | 0 | 0 | 0 | 0 | 0 | 1 | 1 |
| USE | SlowC&M START ADDRESS ID | | | | SlowC&M END ADDRESS ID | | | |

FIG. 8

| ADDRESS OF SlowC&M REGION | ADDRESS ID |
|---|---|
| #Z,1,0 | 0 |
| #Z,1,1 | 1 |
| #Z,1,2 | 2 |
| #Z,1,3 | 3 |
| #Z,65,0 | 4 |
| #Z,65,1 | 5 |
| #Z,65,2 | 6 |
| #Z,65,3 | 7 |
| #Z,129,0 | 8 |
| #Z,129,1 | 9 |
| #Z,129,2 | A |
| #Z,129,3 | B |
| #Z,193,0 | C |
| #Z,193,1 | D |
| #Z,193,2 | E |
| #Z,193,3 | F |

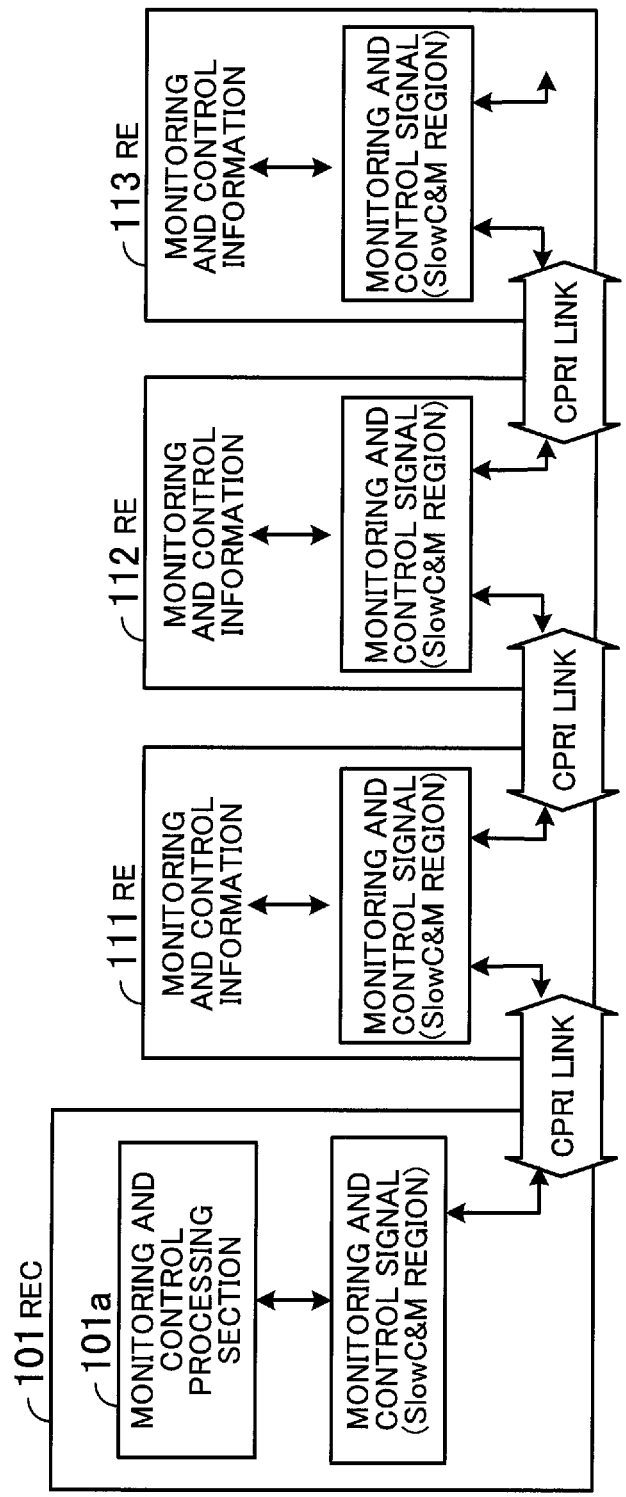

RADIO EQUIPMENT CONTROLLER, RADIO EQUIPMENT, AND COMMUNICATION METHOD

This application is a continuing application, filed under 35 U.S.C. §111(a), of International Application PCT/JP2009/059653, filed on May 27, 2009.

FIELD

The embodiments discussed herein are related to a radio equipment controller and a radio equipment of a base station in which data is transferred via a common interface, and to communication methods by such a radio equipment controller and a radio equipment.

BACKGROUND

A base station included in a radio communication system such as a mobile phone system can be divided into radio equipments (REs) which process a radio signal and a radio equipment control (REC) which controls the REs. A common public radio interface (CPRI) is known as an interface between the REC and the REs (see, for example, Japanese Laid-open Patent Publication No. 2007-312185). With the CPRI an interface between REs and an REC into which a base station is divided is made open. By doing so, many vendors can use each section in a base station.

An REC and REs share slow C&M regions prescribed by the CPRI and exchange monitoring and control information. Accordingly, if one, for example, of REs connected in a daisy-chain fashion occupies slow C&M regions of a monitoring and control signal transmitted or received via the CPRI and transmits monitoring and control information, the other REs cannot insert monitoring and control information in the slow C&M regions. As a result, communication of monitoring and control information is not ensured between the REC and RE.

FIG. 19 is a view for describing occupancy of slow C&M regions of a monitoring and control signal. As illustrated in FIG. 19, REs 111 through 113 are connected to an REC 101 in the daisy-chain fashion. The REC 101 and the REs 111 through 113 transmit or receive monitoring and control information via the CPRI.

The REC 101 includes a monitoring and control processing section 101a. The monitoring and control processing section 101a uses slow C&M regions of a monitoring and control signal transmitted or received via a CPRI link for transmitting monitoring and control information to the REs 111 through 113. In addition, the monitoring and control processing section 101a extracts monitoring and control information transmitted from the REs 111 through 113 from slow C&M regions of a received monitoring and control signal.

Each of the REs 111 through 113 extracts monitoring and control information from slow C&M regions of a monitoring and control signal received via a CPRI link. In addition, each of the REs 111 through 113 inserts monitoring and control information regarding it in slow C&M regions of a monitoring and control signal and transmits the monitoring and control signal via a CPRI link.

It is assumed that the RE 113 inserts a large amount of monitoring and control information in slow C&M regions of a monitoring and control signal. The REC 101 exchanges monitoring and control information with the REs 111 through 113 by sharing slow C&M regions of the monitoring and control signal. Accordingly, the RE 111 or 112 cannot insert monitoring and control information regarding it in slow C&M regions of the monitoring and control signal. As a result, communication of monitoring and control information is not ensured between the REC 101 and the REs 111 through 113.

SUMMARY

According to an aspect, a radio equipment controller in a base station in which data is transferred via a common interface includes: a processor which divides an information region of a frame used for transmitting information to or receiving information from a plurality of radio equipments coupled to the radio equipment controller in a daisy-chain fashion and which assigns the information region after the division to the plurality of radio equipments; and a transmitter which transmits address information for the information region assigned to the plurality of radio equipments by the processor to the plurality of radio equipments.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a view for describing a vendor region in which address information for a slow C&M region is stored;

FIG. 8 is a table indicative of the relationship between a slow C&M region address and address ID;

FIG. 19 is a view for describing occupancy of a slow C&M region of a monitoring and control signal.

DESCRIPTION OF EMBODIMENTS

Figure 1:
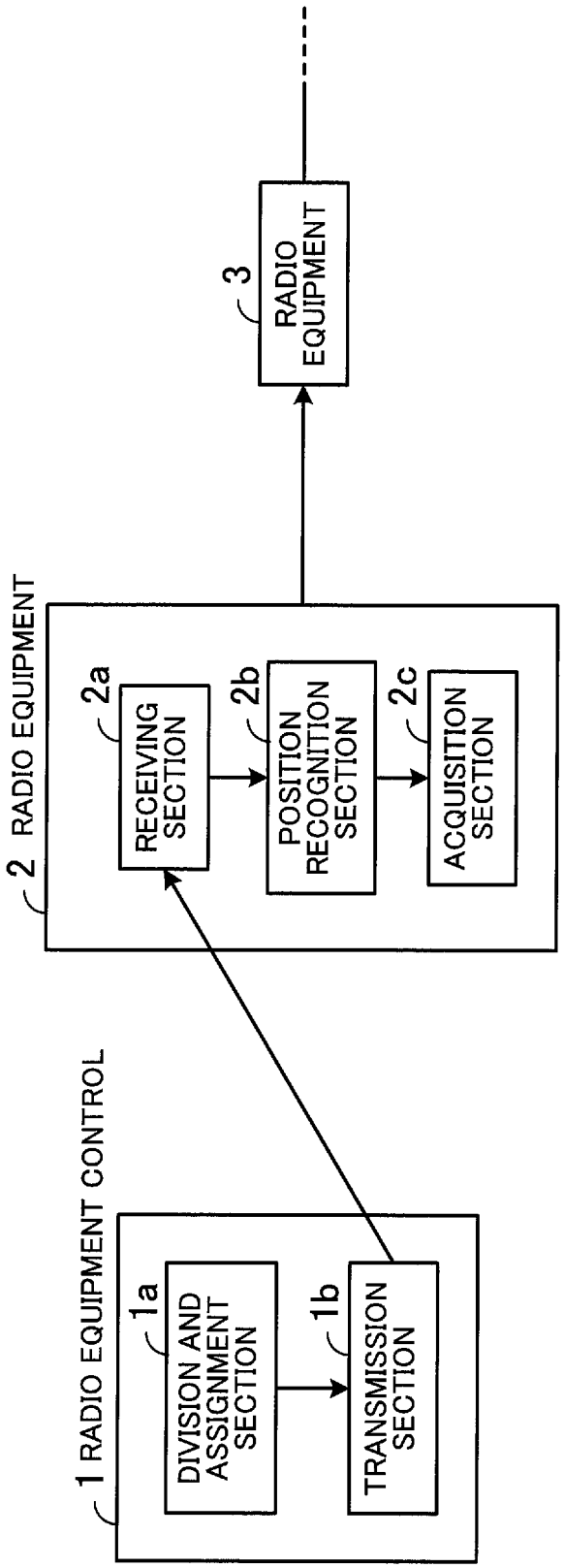
FIG. 1 illustrates a base station according to a first embodiment.

A first embodiment will now be described in detail with reference to the drawing.

FIG. 1 illustrates a base station according to a first embodiment. As illustrated in FIG. 1, a base station includes a radio equipment control 1 and radio equipments 2, 3, and so on. The radio equipments 2, 3, and so on are connected to the radio equipment control 1 in the daisy-chain fashion.

The radio equipment control 1 includes a division and assignment section 1a and a transmission section 1b. The radio equipment 2 includes a receiving section 2a, a position recognition section 2b, and an acquisition section 2c. The radio equipment 3 includes a receiving section, a position recognition section, and an acquisition section (not illustrated). This is the same with the radio equipment 2.

The division and assignment section 1a of the radio equipment control 1 divides an information region of a frame used for exchanging information with the radio equipments 2, 3, and so on, and assigns the information region to the radio equipments 2, 3, and so on. The information which the radio equipment control 1 exchanges with the radio equipments 2, 3, and so on is, for example, information regarding the monitoring and control of the radio equipments 2, 3, and so on.

For example, if four radio equipments are connected to the radio equipment control 1 in the daisy-chain fashion, then the division and assignment section 1a divides an information region of a frame into quarters and assigns the four radio equipments to the quarters.

The transmission section 1b transmits address information for the information region assigned to the radio equipments 2, 3, and so on by the division and assignment section 1a to the radio equipments 2, 3, and so on.

For example, the transmission section 1b stores positional information used by the radio equipments 2, 3, and so on for recognizing their connection positions in a vendor region of a frame which a vendor can freely use. The transmission section 1b then stores the address information for the information region in vendor regions of the frame and transmits it so that the radio equipments 2, 3, and so on can acquire the address information for the information region on the basis of the positional information. More specifically, the transmission section 1b stores the address information for the information region assigned to the radio equipments 2, 3, and so on in vendor regions at increasing addresses in the order of the first through last stages. As a result, the radio equipment 2 at the first stage recognizes from the positional information stored in the vendor region of the frame that the radio equipment 2 is connected at the first stage from the radio equipment control 1, refers to the vendor region in which address information for the information region assigned to the radio equipment at the first stage is stored, and acquires the address information for the information region assigned to the radio equipment 2.

The receiving section 2a of the radio equipment 2 receives a frame from the radio equipment control 1, which controls the radio equipment 2, or the radio equipment 3.

On the basis of the positional information included in the frame received by the receiving section 2a, the position recognition section 2b recognizes the connection position of the radio equipment 2 connected to the radio equipment control 1 in the daisy-chain fashion.

For example, when the positional information is outputted from the radio equipment control 1, it is "0". Each time the positional information passes through each of the radio equipments 2, 3, and so on, the positional information is incremented by "1" by it. Accordingly, by receiving, for example, the positional information "0", the position recognition section 2b of the radio equipment 2 can recognize that the radio equipment 2 is connected in the daisy-chain fashion at the first stage from the radio equipment control 1. In addition, by receiving the positional information "1", the radio equipment 3 can recognize that the radio equipment 3 is connected in the daisy-chain fashion at the second stage from the radio equipment control 1.

The acquisition section 2c refers to the frame on the basis of the connection position of the radio equipment 2 recognized by the position recognition section 2b, and acquires the address information for the information region of the frame used for exchanging information with the radio equipment control 1.

The radio equipment control 1 divides in this way the information region of the frame used for exchanging information with the radio equipments 2, 3, and so on, and assigns the information region after the division to the radio equipments 2, 3, and so on. This prevents the radio equipments 2, 3, and so on from occupying the information region, and communication can be ensured between the radio equipment control 1 and the radio equipments 2, 3, and so on.

Furthermore, the radio equipments 2, 3, and so on use the information region assigned by the radio equipment control 1 for exchanging information with the radio equipment control 1. This prevents the radio equipments 2, 3, and so on from occupying the information region, and communication can be ensured between the radio equipment control 1 and the radio equipments 2, 3, and so on.

A second embodiment will now be described in detail with reference to the drawings.

Figure 2:
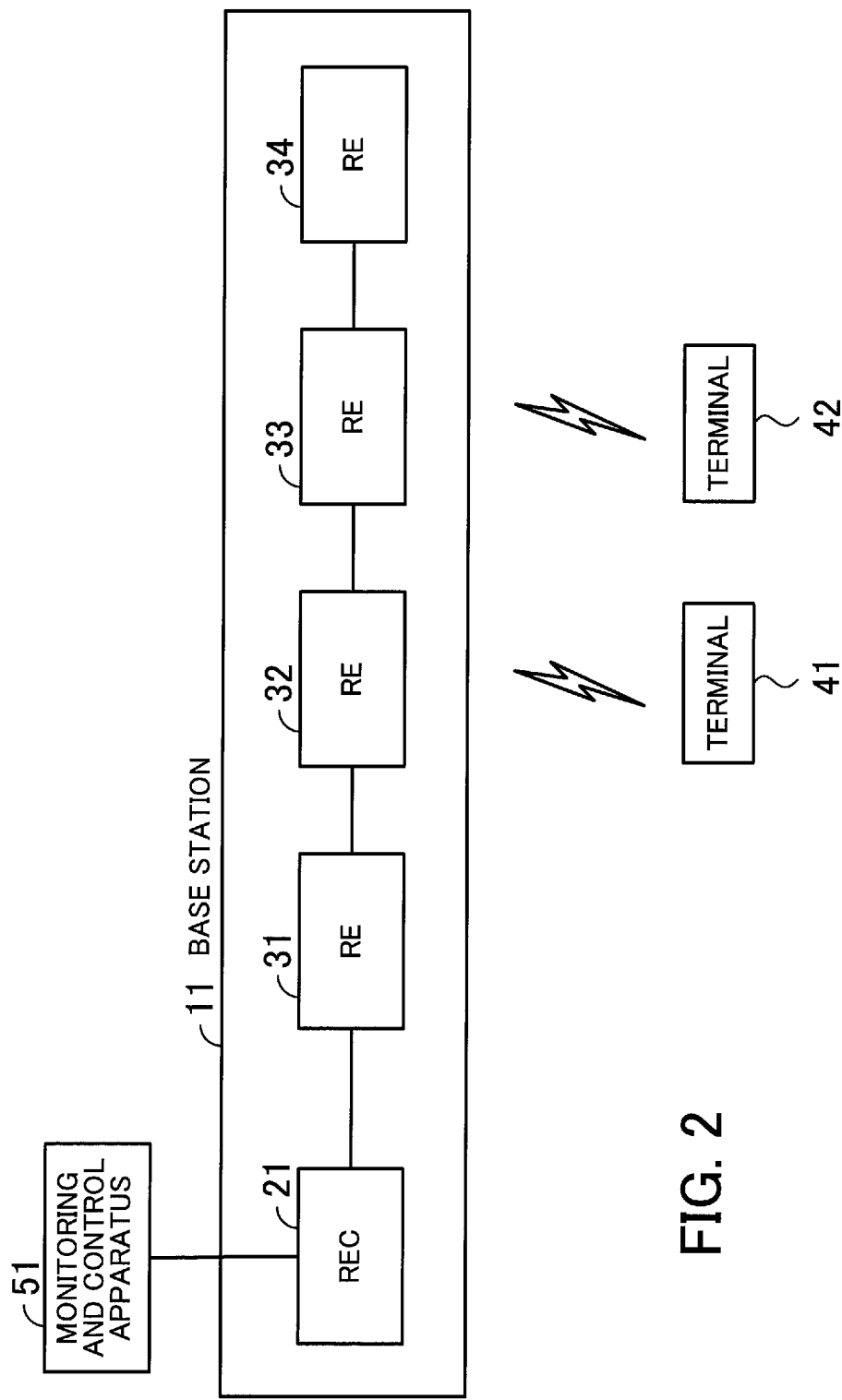
FIG. 2 illustrates an example of the structure of a system of a base station according to a second embodiment.

FIG. 2 illustrates an example of the structure of a system of a base station according to a second embodiment. FIG. 2 illustrates a base station 11, terminals 41 and 42, and a monitoring and control apparatus 51.

The base station 11 includes an REC 21 and REs 31 through 34. The REC 21 and the REs 31 through 34 are connected by, for example, an optical fiber. The REs 31 through 34 are connected to the REC 21 in the daisy-chain fashion. The REC 21 exchanges monitoring and control signals with the REs 31 through 34 via a CPRI. In FIG. 2, the four REs 31 through 34 are illustrated. However, it is a matter of course that the number of REs is not limited to four. More than four REs or less than four REs may be connected.

Each of the terminals 41 and 42 is, for example, a portable telephone. For example, the terminal 41 performs radio communication with the RE 32 and the terminal 42 performs radio communication with the RE 33. Data is transmitted from the terminals 41 and 42 to the REC 21 via the REs 32 and 33, respectively, by the use of monitoring and control signals. The data transmitted from the terminals 41 and 42 to the REC 21 is transmitted to, for example, other base stations (not illustrated) and is then transmitted to other terminals. In addition, data transmitted from terminals (not illustrated) is received by the REC 21 and is transmitted to the terminals 41 and 42 via the REs 31 through 33 by the use of monitoring and control signals.

The monitoring and control apparatus 51 is operated by, for example, a person who maintains the base station 11. The monitoring and control apparatus 51 transmits monitoring and control information for monitoring and controlling the REs 31 through 34 to the REC 21 according to operation by the person who maintains the base station 11.

The REC 21 terminates the monitoring and control information transmitted from the monitoring and control apparatus 51, inserts the monitoring and control information in slow C&M regions of a monitoring and control signal, and transmits the monitoring and control information to the REs 31 through 34. Monitoring and control information for monitoring and controlling the REC 21 and the REs 31 through 34 is stored in slow C&M regions. Information stored in a slow C&M region is transmitted or received in a high-level data link control (HDLC) format.

Each of the REs 31 through 34 inserts monitoring and control information in slow C&M regions of a monitoring and control signal and transmits the monitoring and control information to the REC 21. The monitoring and control information transmitted by each of the REs 31 through 34 is, for example, information indicative of the result of monitoring and controlling it on the basis of the monitoring and control information transmitted from the monitoring and control apparatus 51. The REC 21 extracts the monitoring and control information transmitted by each of the REs 31 through 34 from the monitoring and control signal, terminates the monitoring and control information, and transmits the monitoring and control information to the monitoring and control apparatus 51.

Figure 3:
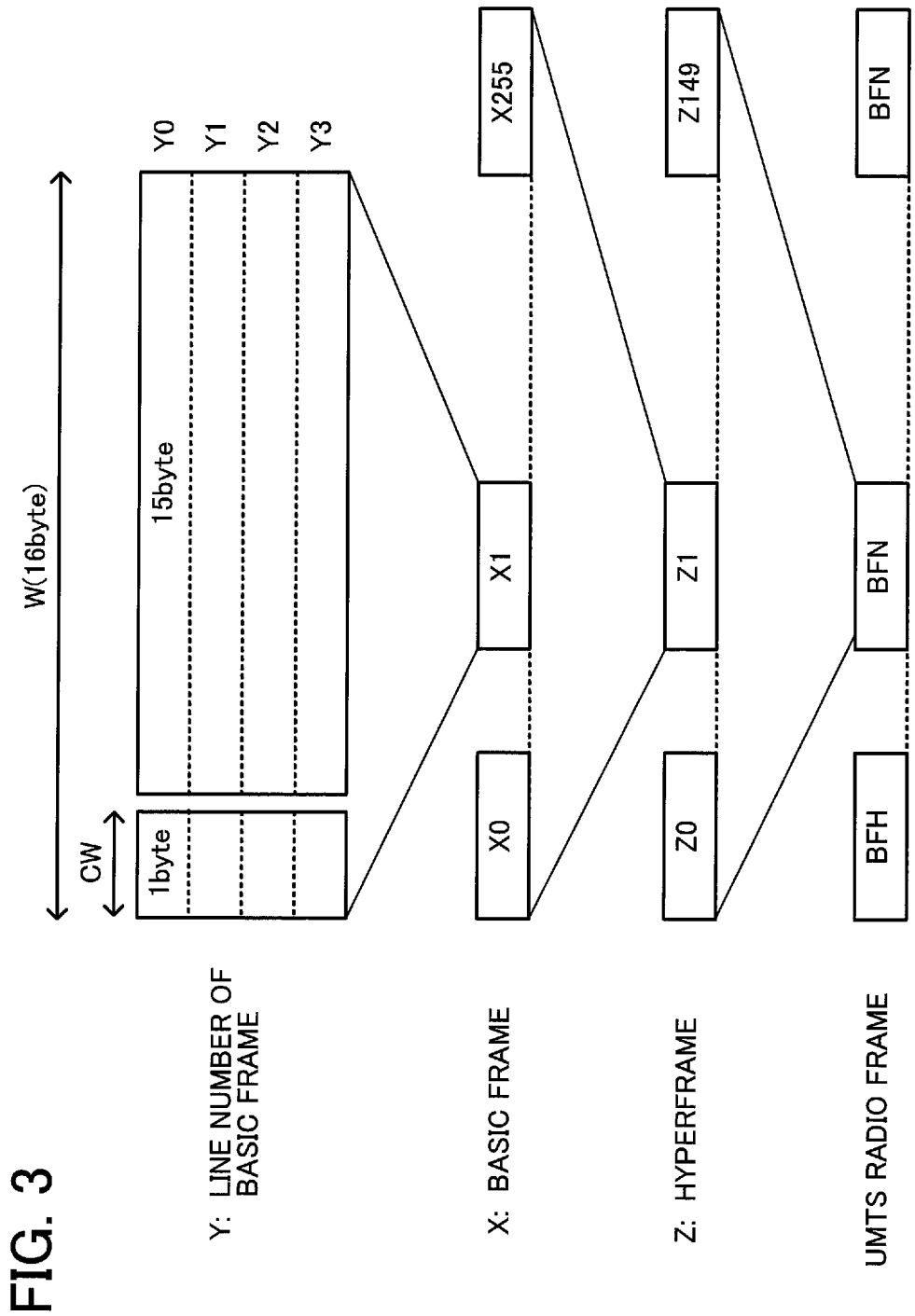
FIG. 3 illustrates an example of the structure of a frame of a monitoring and control signal.

Monitoring and control signals exchanged between the REC 21 and the REs 31 through 34 will be described. FIG. 3 illustrates an example of the structure of a frame of a monitoring and control signal. As illustrated in FIG. 3, a monitoring and control signal has a hierarchical structure made up of basic frames, hyperframes, and universal mobile telecommunication systems (UMTS) radio frames. A group of 256 basic frames forms a hyperframe and a group of 150 hyperframes form a UMTS radio frame.

X0 through X255 are assigned to basic frames as indices. Z0 through Z149 are assigned to hyperframes as indices. In addition, Y0 through Y3 are assigned as line numbers in a basic frame. Where a basic frame is arranged in a UMTS radio frame can be indicated by Z, X, and Y (Z, X, and Y are positive integers).

With a basic frame, as illustrated in FIG. 3, 16 bytes are treated as one unit. A basic frame is managed by the values of Y0 through Y3. One leading byte of a basic frame is defined as a control word (CW) and IQ data is stored in the remaining 15 bytes.

Figure 4:
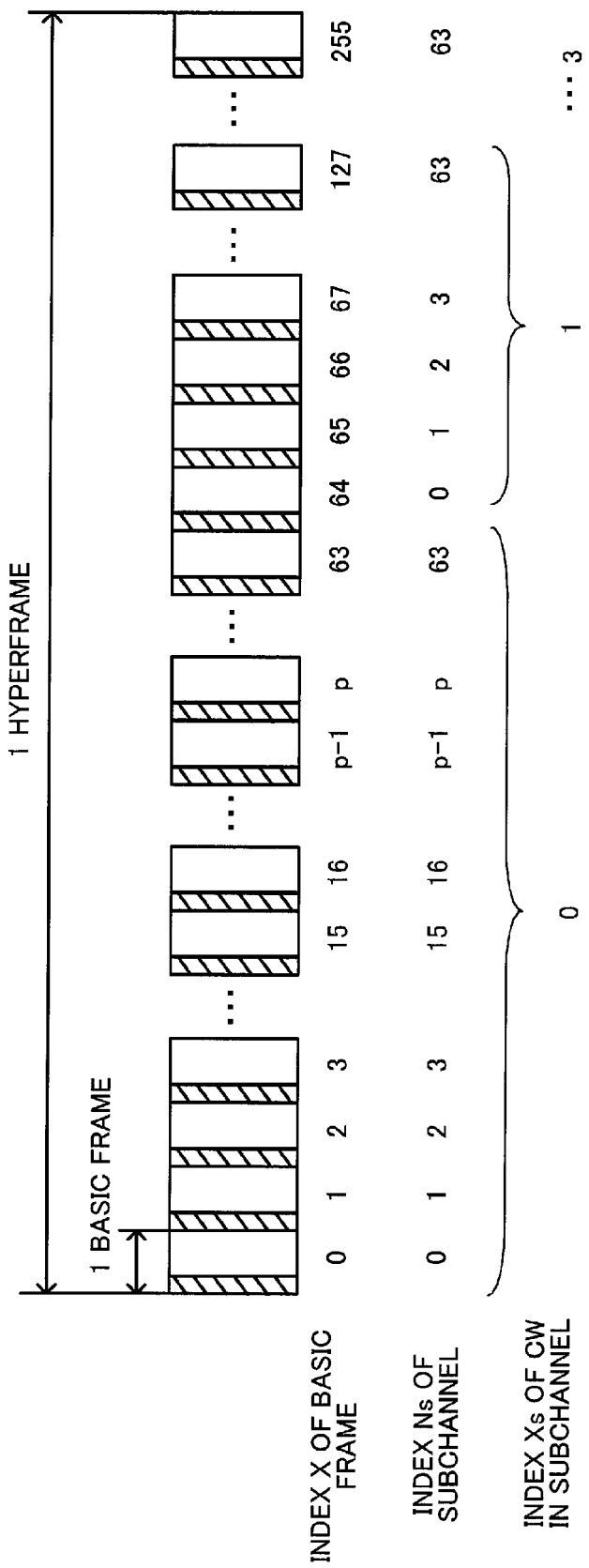
FIG. 4 illustrates the details of a hyperframe.

FIG. 4 illustrates the details of a hyperframe. FIG. 4 illustrates one hyperframe. As stated above, one hyperframe is made up of 256 basic frames to which X0 through X255 are assigned as indices. In FIG. 4, a portion of a basic frame in which oblique lines are drawn indicates a control word.

As illustrated in FIG. 4, 64 subchannels are formed from 256 basic frames. As illustrated in FIG. 4, 0 through 63 are assigned to the basic frames included in the subchannels as indices Ns. In addition, 0 through 4 are assigned to control words included in each subchannel as indices Xs.

Control words included in one hyperframe have meaning as headers by forming 64 subchannels from 256 basic frames.

Figure 5:
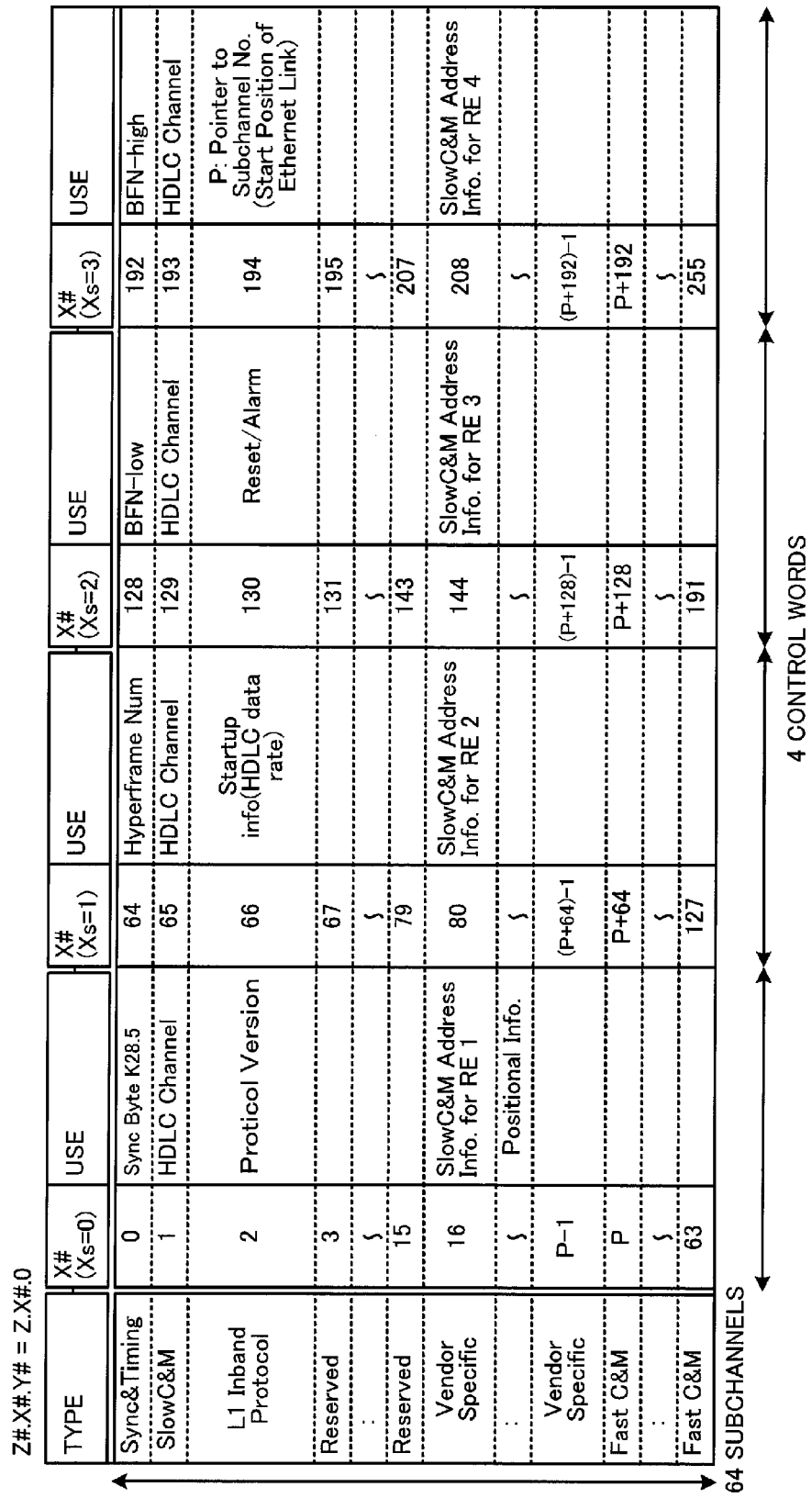
FIG. 5 illustrates control word mapping.

FIG. 5 illustrates control word mapping. As illustrated in FIG. 5, control words have meaning as headers by forming 64 subchannels from basic frames included in one hyperframe. Xs in FIG. 5 corresponds to Xs in FIG. 4. The control words have a determined meaning by putting them together in a way illustrated in FIG. 5.

In the example of FIG. 5, addresses of slow C&M regions are (Z, 1, 0), (Z, 65, 0), (Z, 129, 0), and (z, 193, 0). The number of the slow C&M regions is four. If the line numbers Y0 through Y3 of a basic frame are used, addresses of slow C&M regions are (Z, 1, 0), (Z, 65, 0), (Z, 129, 0), (z, 193, 0), (Z, 1, 1), (Z, 65, 1), (Z, 129, 1), (z, 193, 1), (Z, 1, 2), (Z, 65, 2), (Z, 129, 2), (z, 193, 2), (Z, 1, 3), (Z, 65, 3), (Z, 129, 3), and (z, 193, 3). The number of the slow C&M regions is sixteen. In the following description it is assumed that the line numbers Y0 through Y3 of a basic frame are used and that the number of slow C&M regions is sixteen.

The REC 21 illustrated in FIG. 2 divides a plurality of slow C&M regions and assigns the plurality of slow C&M regions to the REs 31 through 34. For example, the REC 21 quadrisects 16 slow C&M regions, assigns slow C&M regions at the addresses Z, 1, 0 through Z, 1, 3 to the RE 31, assigns slow C&M regions at the addresses Z, 65, 0 through Z, 65, 3 to the RE 32, assigns slow C&M regions at the addresses Z, 129, 0 through Z, 129, 3 to the RE 33, and assigns slow C&M regions at the addresses Z, 193, 0 through Z, 193, 3 to the RE 34.

The REC 21 gives the REs 31 through 34 notice of the slow C&M regions assigned to the REs 31 through 34 by the use of address information for the slow C&M regions. The REs 31 through 34 recognize the slow C&M regions which they can use on the basis of the address information, and use the slow C&M regions which they recognize for transmitting and receiving monitoring and control information.

Before establishing a slow C&M region link with the REs 31 through 34, the REC 21 uses vendor regions ("Vendor Specific" in FIG. 5) of a monitoring and control signal for giving the REs 31 through 34 notice of the address information for the slow C&M regions assigned to the REs 31 through 34. At this time the REC 21 stores positional information which the REs 31 through 34 use for recognizing their connection positions in a vendor region of the monitoring and control signal. A user can freely use a vendor region.

When each of the REs 31 through 34 receives the monitoring and control signal including the address information for the slow C&M regions and the positional information, it increments the positional information stored in the vendor region by, for example, and outputs incremented positional information to REs 31 through 34 at the next stage. By doing so, each of the REs 31 through 34 which receives the monitoring and control signal can recognize a stage from the REC 21 at which it is connected in the daisy-chain fashion.

Figure 6:
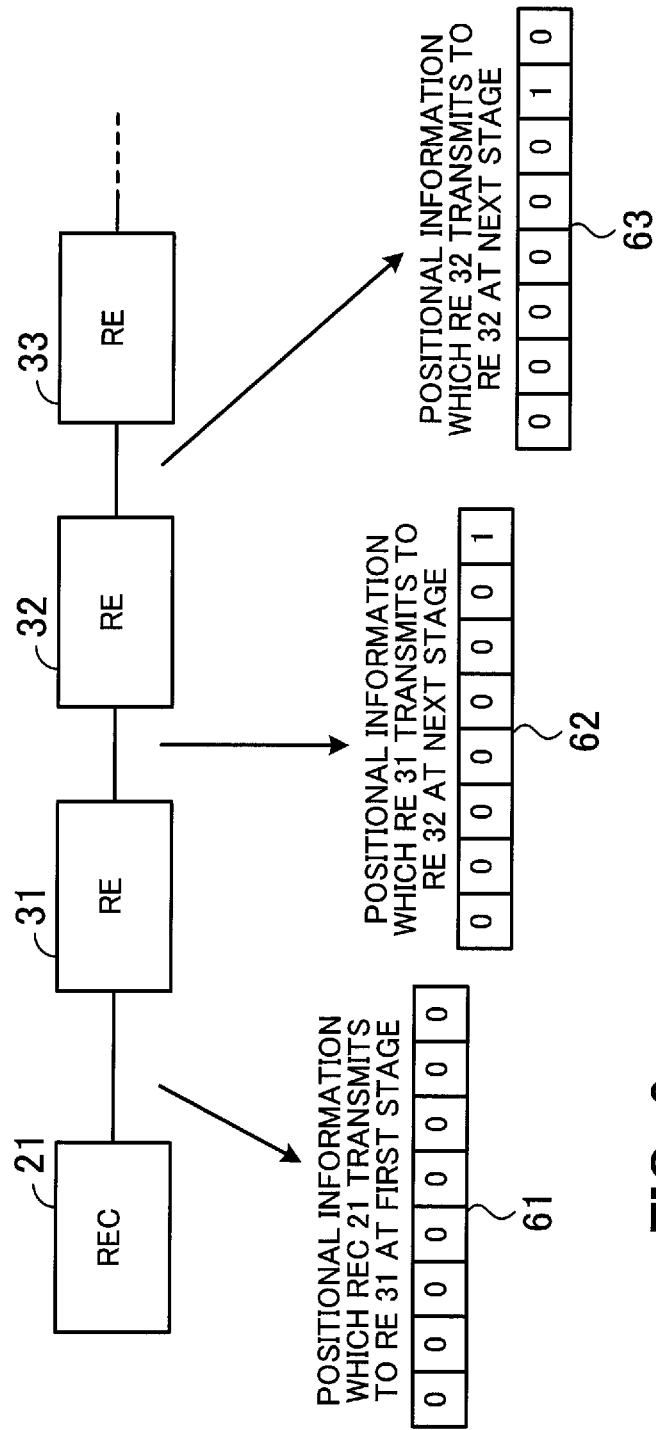
FIG. 6 is a view for describing positional information.

FIG. 6 is a view for describing the positional information. In FIG. 6, the REC 21 and the REs 31 through of FIG. 2 are illustrated. In FIG. 6, positional information 61 through 63 stored in a vendor region of a monitoring and control signal is also illustrated.

As indicated by the positional information 61, the REC 21 stores, for example, the positional information "0" in the vendor region (as "Positional Information" in the vendor region illustrated in FIG. 5) and transmits it to the RE 31 at the first stage. By receiving the monitoring and control signal including the positional information "0", the RE 31 can recognize that the RE 31 is connected at the first stage from the REC 21 in the daisy-chain fashion.

As indicated by the positional information 62, the RE 31 increments the positional information received from the REC 21 by "1" and transmits the incremented positional information to the RE 32 at the next stage. By receiving the monitoring and control signal including the positional information "1", the RE 32 can recognize that the RE 32 is connected at the second stage from the REC 21 in the daisy-chain fashion.

As indicated by the positional information 63, the RE 32 increments the positional information received from the RE 31 by "1" and transmits the incremented positional information to the RE 33 at the next stage. By receiving the monitoring and control signal including the positional information "2", the RE 33 can recognize that the RE 33 is connected at the third stage from the REC 21 in the daisy-chain fashion. Similarly, the RE 34 at the next stage recognizes a position from the REC 21 at which it is connected in the daisy-chain fashion.

As stated above, the REC 21 stores the address information for the slow C&M regions assigned to the REs 31 through 34 and the positional information in the vendor regions of the monitoring and control signal and transmits them to the REs 31 through 34. The REC 21 associates the vendor regions with the connection positions of the REs 31 through 34 and stores the address information for the slow C&M regions assigned to the REs 31 through 34 in the vendor regions.

As indicated in FIG. 5, for example, the REC 21 associates a vendor region at the address Z, 16, 0 with RE 1 connected at the first stage from the REC 21 and stores address information for slow C&M regions assigned to the RE 1 at the first stage in the vendor region at the address Z, 16, 0. The REC 21 associates a vendor region at the address Z, 80, 0 with RE 2 connected at the second stage from the REC 21 and stores address information for slow C&M regions assigned to the RE 2 at the second stage in the vendor region at the address Z, 16, 0. Similarly, the REC 21 associates vendor regions with REs 3 and 4 connected at the third and fourth stages from the REC 21 and stores address information for slow C&M regions assigned to the REs 3 and 4 at the third and fourth stages in vendor regions at the addresses Z, 144, 0 and z, 208, 0 respectively. The REs 1 through 4 of FIG. 5 correspond to the REs 31 through 34, respectively, of FIG. 2.

Each of the REs 31 through 34 recognizes an address of a vendor region in which information indicative of a stage from the REC 21 where it is connected is stored and an address of a vendor region in which address information for slow C&M regions assigned thereto is stored. For example, the REs 31 through 34 recognize that the address information for the slow C&M regions assigned to the RE 31 at the first stage is stored in the vendor region at the address Z, 16, 0. Furthermore, the REs 31 through 34 recognize that the address information for the slow C&M regions assigned to the RE 32 at the second stage is stored in the vendor region at the address Z, 80, 0.

As stated above, the REs 31 through 34 recognize their connection positions by positional information. As a result, each of the REs 31 through 34 can recognize a vendor region at an address which it should refer to for acquiring address information for slow C&M regions assigned thereto.

For example, the RE 31 connected at the first stage from the REC 21 recognizes that the address information for the slow C&M regions assigned thereto is stored in the vendor region at the address Z, 16, 0. The RE 31 then acquires the address information stored in the vendor region at the address Z, 16, 0. The RE 32 connected at the second stage from the REC 21 recognizes that the address information for the slow C&M regions assigned thereto is stored in the vendor region at the address Z, 80, 0. The REC 21 then acquires the address information stored in the vendor region at the address Z, 80, 0.

FIG. 7 is a view for describing a vendor region in which address information for a slow C&M region is stored. In FIG. 7, the vendor region of FIG. 5 corresponding to "Slow C&M Address Information for RE 1" is illustrated.

As illustrated in FIG. 7, the vendor region includes an 8-bit data region. Address ID for a start address of the slow C&M regions assigned to the RE 1 (RE 31) is stored in the 4 high-order bits of the vendor region and address ID for an end address of the slow C&M regions assigned to the RE 31 is stored in the 4 low-order bits of the vendor region. In the example of FIG. 7, address ID for a start address of the slow C&M regions assigned to the RE 31 is "0" and address ID for an end address of the slow C&M regions assigned to the RE 31 is "3". The data structure of the vendor regions assigned to the other REs 2 through 4 (REs 32 through 34) is the same as that illustrated in FIG. 7. Hereinafter start address ID and end address ID may also be referred to as "address ID".

FIG. 8 is a table indicative of the relationship between a slow C&M region address and address ID. As indicated in FIG. 8, a slow C&M region address is associated with address ID by a table. The REC 21 and the REs 31 through 34 store the table indicated in FIG. 8 in their storage units.

The REC 21 refers to the table indicated in FIG. 8, converts start addresses and end addresses of slow C&M regions assigned to the REs 31 through 34 to address ID, stores the address ID in vendor regions of a monitoring and control signal as address information, and transmits it to the REs 31 through 34.

For example, it is assumed that the REC 21 assigns the slow C&M regions at the addresses Z, 1, 0 through Z, 1, 3 to the RE 31. In this case, the REC 21 refers to the table indicated in FIG. 8, and converts the start address Z, 1, 0 and the end address Z, 1, 3 of the slow C&M regions assigned to the RE 31 to the start address ID "0" and the end address ID "3". As illustrated in FIG. 7, the REC 21 stores the start address ID "0" and the end address ID "3" obtained by the conversion in the vendor region corresponding to the RE 31.

Each of the REs 31 through 34 refers to the table indicated in FIG. 8, and recognizes slow C&M regions assigned thereto from address ID included in a vendor region. For example, it is assumed that the RE 31 receives a monitoring and control signal including the vendor region illustrated in FIG. 7. In this case, the RE 31 refers to the table indicated in FIG. 8, and recognizes from the start address ID "0" and the end address ID "3" stored in the vendor region that the slow C&M regions at the addresses Z, 1, 0 through Z, 1, 3 are assigned to the RE 31.

Figure 9:
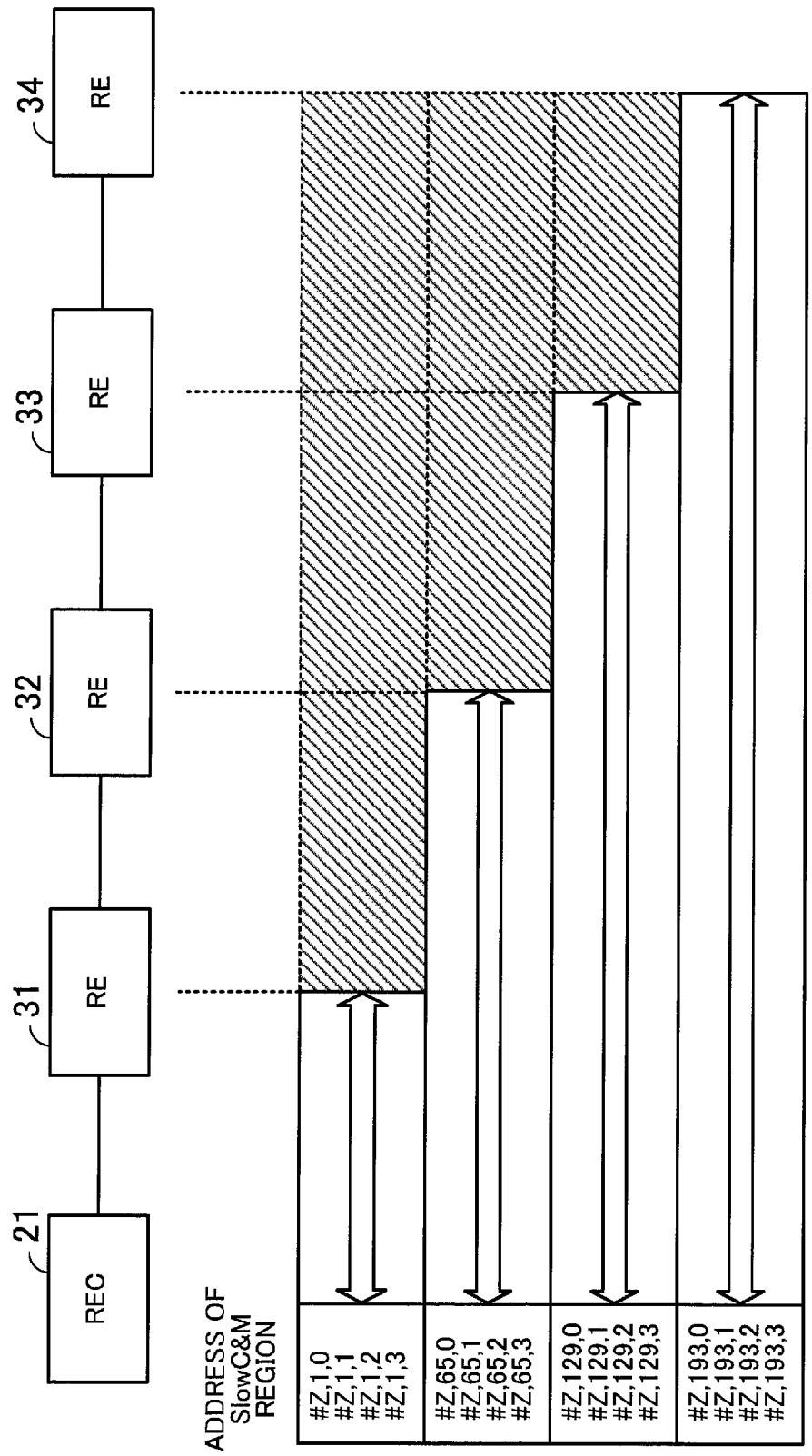
FIG. 9 is a view for describing a band of monitoring and control information exchanged between an REC and REs.

FIG. 9 is a view for describing a band of monitoring and control information exchanged between the REC and the REs. In FIG. 9, the REC 21 and the REs 31 through 34 of FIG. 2 are illustrated.

It is assumed that the REC 21 assigns the slow C&M regions at the addresses (Z, 1, 0), (Z, 1, 1), (Z, 1, 2), and (Z, 1, 3) to the RE 31. It is assumed that the REC 21 assigns the slow C&M regions at the addresses (Z, 65, 0), (Z, 65, 1), (Z, 65, 2), and (Z, 65, 3) to the RE 32. It is assumed that the REC 21 assigns the slow C&M regions at the addresses (Z, 129, 0), (Z, 129, 1), (Z, 129, 2), and (Z, 129, 3) to the RE 33. It is assumed that the REC 21 assigns the slow C&M regions at the addresses (Z, 193, 0), (Z, 193, 1), (Z, 193, 2), and (Z, 193, 3) to the RE 34.

In this case, as illustrated in FIG. 9, each of the REs 31 through 34 uses slow C&M regions assigned thereto for exchanging monitoring and control information with the REC 21. As a result, each of the REs 31 through does not occupy all of the slow C&M regions, so communication of monitoring and control information by each of the REs 31 through 34 can be ensured.

Figure 10:
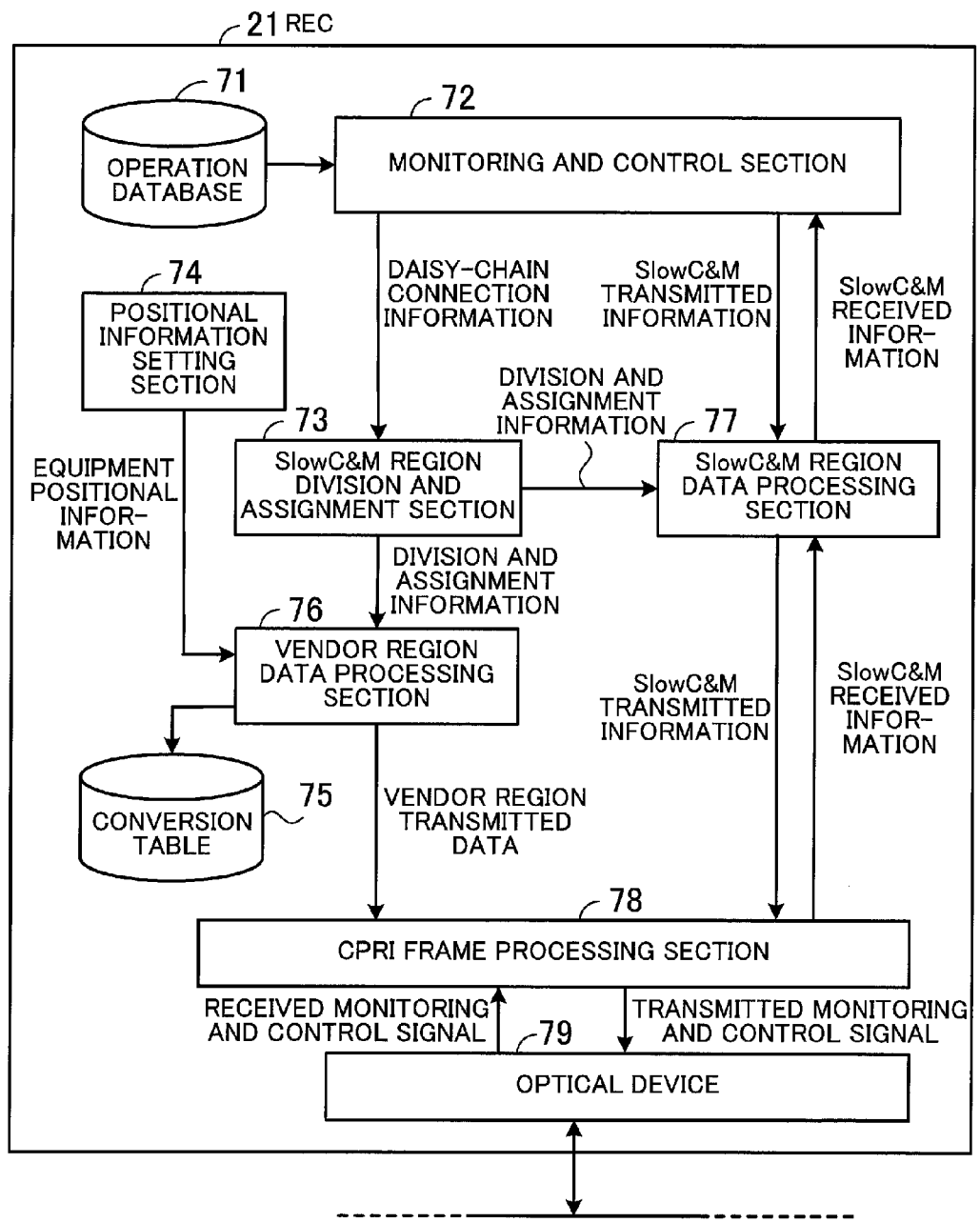
FIG. 10 is a block diagram of the REC.

FIG. 10 is a block diagram of the REC. As illustrated in FIG. 10, the REC 21 includes an operation database (DB) 71, a monitoring and control section 72, a slow C&M region division and assignment section 73, a positional information setting section 74, a conversion table (TB) 75, a vendor region data processing section 76, a slow C&M region data processing section 77, a CPRI frame processing section 78, and an optical device 79.

The operation database 71 stores operation data for the REC 21. The operation data includes information (daisy-chain connection information) for the REs 31 through 34 connected to the REC 21 in the daisy-chain fashion. The daisy-chain connection information indicates, for example, the number of the REs 31 through 34 connected to the REC 21 in the daisy-chain fashion. The number of the REs 31 through 34 connected to the REC 21 in the daisy-chain fashion is determined at the time of, for example, designing the base station 11. Furthermore, the number of the operation databases 71 can be changed in the case of adding RE to be connected.

The monitoring and control section 72 starts, monitors, and controls the REC 21. For example, the monitoring and control section 72 reads out operation data from the operation database 71 at the time of starting the REC 21. The monitoring and control section 72 extracts daisy-chain connection information from the operation data read out and outputs the daisy-chain connection information to the slow C&M region division and assignment section 73.

In addition, the monitoring and control section 72 outputs monitoring and control information to be transmitted to the REs 31 through 34 to the slow C&M region data processing section 77 as slow C&M transmitted information. Furthermore, the monitoring and control section 72 receives slow C&M received information outputted from the slow C&M region data processing section 77.

The slow C&M region division and assignment section 73 divides slow C&M regions on the basis of the daisy-chain connection information outputted from the monitoring and control section 72, and assigns the slow C&M regions after the division to the REs 31 through 34. The slow C&M region division and assignment section 73 outputs the result of dividing and assigning the slow C&M regions to the vendor region data processing section 76 and the slow C&M region data processing section 77 as division and assignment information.

In the example of FIG. 2, for instance, the four REs 31 through 34 are connected to the REC 21 in the daisy-chain fashion, so the daisy-chain connection information is "4". In addition, if the line numbers Y0 through Y3 of a basic frame, for example, are used, then the number of the slow C&M regions is sixteen. For example, the slow C&M region division and assignment section 73 quadrisects the sixteen slow C&M regions, assigns four slow C&M regions equally in the order of the RE 31 at the first stage, the RE 32 at the second stage, the RE 33 at the third stage, and the RE 34 at the fourth stage, and outputs division and assignment information to the vendor region data processing section 76 and the slow C&M region data processing section 77. More specifically, the slow C&M region division and assignment section 73 assigns the four slow C&M regions at the addresses (Z, 1, 0), (Z, 1, 1), (Z, 1, 2), and (Z, 1, 3) to the RE 31. The slow C&M region division and assignment section 73 assigns the four slow C&M regions at the addresses (Z, 65, 0), (Z, 65, 1), (Z, 65, 2), and (Z, 65, 3) to the RE 32. The slow C&M region division and assignment section 73 assigns the four slow C&M regions at the addresses (Z, 129, 0), (Z, 129, 1), (Z, 129, 2), and (Z, 129, 3) to the RE 33. The slow C&M region division and assignment section 73 assigns the four slow C&M regions at the addresses (Z, 193, 0), (Z, 193, 1), (Z, 193, 2), and (Z, 193, 3) to the RE 34. The slow C&M region division and assignment section 73 outputs division and assignment information to the vendor region data processing section 76 and the slow C&M region data processing section 77.

The positional information setting section 74 outputs equipment positional information to the vendor region data processing section 76. The equipment positional information is positional information used by each of the REs 31 through 34 for recognizing its connection position, and is, for example, "0".

As indicated in FIG. 8, the conversion table stores the relationship between a slow C&M region address and address ID.

The vendor region data processing section 76 refers to conversion table 75 on the basis of the division and assignment information outputted from the slow C&M region division and assignment section 73, and acquires address ID (address information) to be stored in vendor regions of a monitoring and control signal. The vendor region data processing section 76 outputs the address ID acquired by referring to the conversion table 75 and the equipment positional information outputted from the positional information setting section 74 to the CPRI frame processing section 78 as vendor region transmitted data.

For example, the vendor region data processing section 76 refers to the conversion table 75 on the basis of the division and assignment information outputted from the slow C&M region division and assignment section 73, and acquires start address ID and end address ID for the slow C&M regions assigned to the REs 31 through 34. In the example of FIG. 8, the vendor region data processing section 76 acquires "0" and "3" as start address ID and end address ID, respectively, for the slow C&M regions assigned to the RE 31. In addition, the vendor region data processing section 76 acquires and "7" as start address ID and end address ID, respectively, for the slow C&M regions assigned to the RE 32. Similarly, the vendor region data processing section 76 acquires "8" and "B" as start address ID and end address ID, respectively, for the slow C&M regions assigned to the RE 33. The vendor region data processing section 76 acquires "C" and "F" as start address ID and end address ID, respectively, for the slow C&M regions assigned to the RE 34. The vendor region data processing section 76 outputs this address ID acquired and the equipment positional information to the CPRI frame processing section 78 as vendor region transmitted data.

On the basis of the division and assignment information outputted from the slow C&M region division and assignment section 73, the slow C&M region data processing section 77 assigns the slow C&M transmitted information (monitoring and control information) to be transmitted to the REs 31 through 34 outputted from the monitoring and control section 72 to the slow C&M regions of the monitoring and control signal. The slow C&M region data processing section 77 outputs the slow C&M transmitted information assigned to the slow C&M regions to the CPRI frame processing section 78 as slow C&M transmitted data.

In the above example, for instance, the slow C&M regions at the addresses (Z, 1, 0), (Z, 1, 1), (Z, 1, 2), and (Z, 1, 3) are assigned to the RE 31. Accordingly, the slow C&M region data processing section 77 assigns the slow C&M transmitted data to be transmitted to the RE 31 to the slow C&M regions at the addresses (Z, 1, 0), (Z, 1, 1), (Z, 1, 2), and (Z, 1, 3) of the monitoring and control signal. In addition, the slow C&M region data processing section 77 assigns the slow C&M transmitted data to be transmitted to the RE 32 to the slow C&M regions at the addresses (Z, 65, 0), (Z, 65, 1), (Z, 65, 2), and (Z, 65, 3) of the monitoring and control signal. Similarly, the slow C&M region data processing section 77 assigns the slow C&M transmitted data to be transmitted to the REs 33 and 34 to the slow C&M regions of the monitoring and control signal. The slow C&M region data processing section 77 outputs the slow C&M transmitted information assigned to the slow C&M regions to the CPRI frame processing section 78 as the slow C&M transmitted data.

Furthermore, on the basis of the division and assignment information outputted from the slow C&M region division and assignment section 73, the slow C&M region data processing section 77 understands which of the REs 31 through 34 transmits slow C&M received data outputted from the CPRI frame processing section 78.

For example, the slow C&M region data processing section 77 recognizes slow C&M received data stored in the slow C&M regions at the addresses (Z, 1, 0), (Z, 1, 1), (Z, 1, 2), and (Z, 1, 3) as data transmitted from the RE 31. In addition, the slow C&M region data processing section 77 recognizes slow C&M received data stored in the slow C&M regions at the addresses (Z, 65, 0), (Z, 65, 1), (Z, 65, 2), and (Z, 65, 3) as data transmitted from the RE 32. Similarly, the slow C&M region data processing section 77 recognizes data transmitted from the REs 33 and 34. The slow C&M region data processing section 77 outputs the slow C&M received data received from the REs 31 through 34 to the monitoring and control section 72 as slow C&M received information.

The CPRI frame processing section 78 stores the vendor region transmitted data outputted from the vendor region data processing section 76 in vendor regions of the monitoring and control signal, and generates a monitoring and control signal frame.

For example, the CPRI frame processing section 78 stores the start address ID and the end address ID for the slow C&M regions assigned to the REs 31 through 34 included in the vendor region transmitted data outputted from the vendor region data processing section 76 in the vendor regions of the monitoring and control signal. To be concrete, the CPRI frame processing section 78 stores the start address ID "0" and the end address ID "3" for the slow C&M regions assigned to the RE 31 in the vendor region corresponding to "Slow C&M Address Information for RE 1" indicated in FIG. 5. The CPRI frame processing section 78 stores the start address ID "4" and the end address ID "7" for the slow C&M regions assigned to the RE 32 in the vendor region corresponding to "Slow C&M Address Information for RE 2" indicated in FIG. 5. Similarly, the CPRI frame processing section 78 stores the address ID for the slow C&M regions assigned to the REs 33 and 34 in the vendor regions corresponding to "Slow C&M Address Information for RE 3" and "Slow C&M Address Information for RE 4" respectively. In addition, the CPRI frame processing section 78 stores the equipment positional information "0" included in the vendor region transmitted data outputted from the vendor region data processing section 76 in the vendor region corresponding to "Positional Information" indicated in FIG. 5.

Furthermore, the CPRI frame processing section 78 stores the slow C&M transmitted data outputted from the slow C&M region data processing section 77 in the slow C&M regions of the monitoring and control signal, and generates a monitoring and control signal frame.

For example, the CPRI frame processing section 78 stores the slow C&M transmitted data to be transmitted to the RE 31 in the slow C&M regions at the addresses (Z, 1, 0), (Z, 1, 1), (Z, 1, 2), and (Z, 1, 3). The CPRI frame processing section 78 stores the slow C&M transmitted data to be transmitted to the RE 32 in the slow C&M regions at the addresses (Z, 65, 0), (Z, 65, 1), (Z, 65, 2), and (Z, 65, 3). Similarly, the CPRI frame processing section 78 stores the slow C&M transmitted data to be transmitted to the REs 33 and 34 in the slow C&M regions at the addresses assigned thereto.

In addition, the CPRI frame processing section 78 extracts slow C&M received data from slow C&M regions of a received monitoring and control signal outputted from the optical device 79. The CPRI frame processing section 78 outputs the slow C&M received data extracted to the slow C&M region data processing section 77.

The optical device 79 converts the transmitted monitoring and control signal outputted from the CPRI frame processing section 78 to an optical signal and outputs the optical signal via the optical fiber. In addition, the optical device 79 converts a received monitoring and control signal received via the optical fiber to an electrical signal and outputs the electrical signal to the CPRI frame processing section 78.

Figure 11:
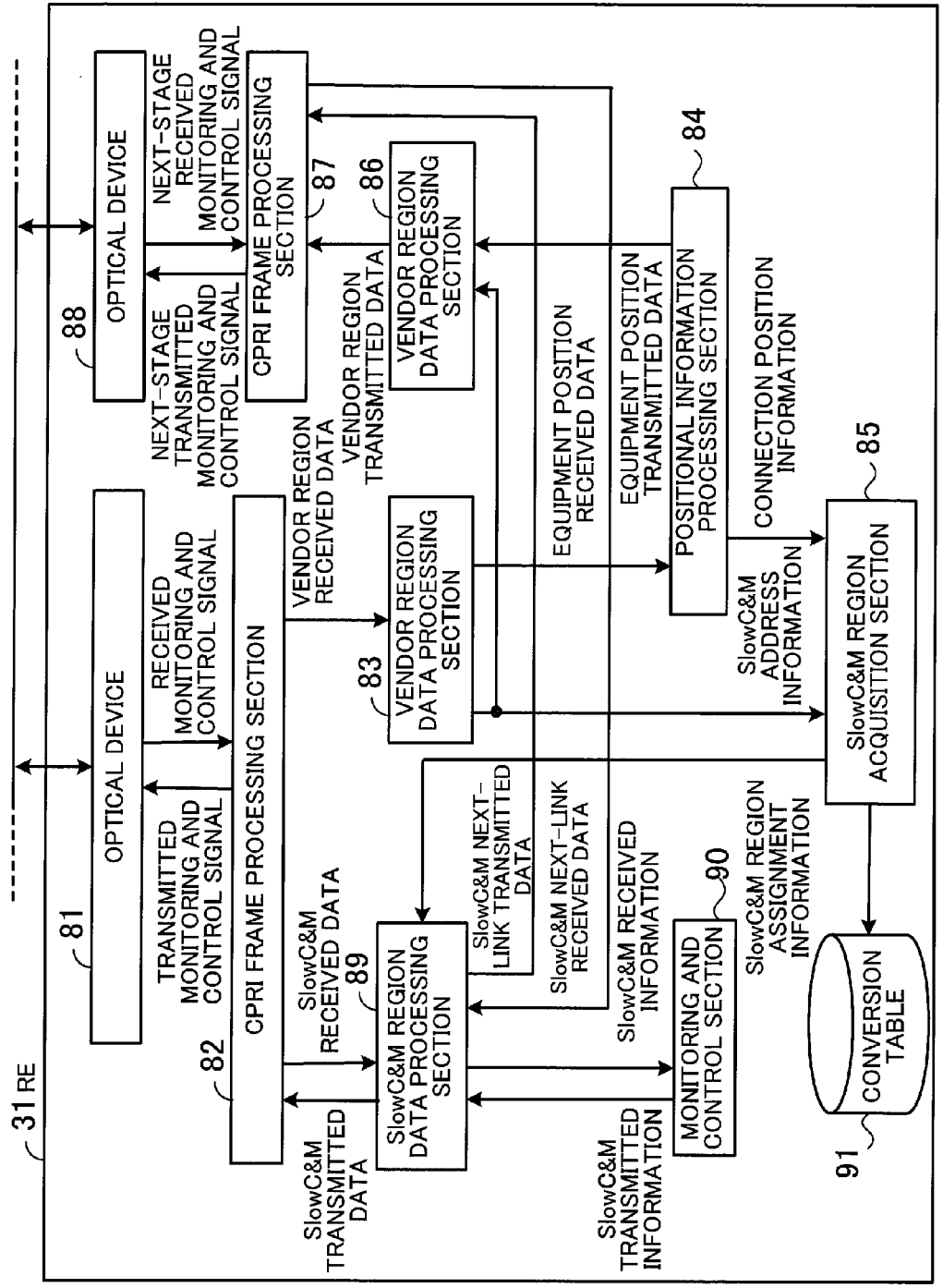
FIG. 11 is a block diagram of RE.

FIG. 11 is a block diagram of the RE. As illustrated in FIG. 11, the RE 31 includes optical devices 81 and 88, CPRI frame processing sections 82 and 87, vendor region data processing sections 83 and 86, a positional information processing section 84, a slow C&M region acquisition section 85, a slow C&M region data processing section 89, a monitoring and control section 90, and a conversion table 91. The structure of the REs 32 through 34 is the same as that illustrated in FIG. 11, and descriptions of them will be omitted.

The optical device 81 receives a monitoring and control signal via the optical fiber, converts the received monitoring and control signal to an electrical signal, and outputs the electrical signal to the CPRI frame processing section 82. In addition, the optical device 81 converts a transmitted monitoring and control signal outputted from the CPRI frame processing section 82 to an optical signal, and outputs the optical signal via the optical fiber.

The CPRI frame processing section 82 extracts information stored in a vendor region of the received monitoring and control signal. The CPRI frame processing section 82 outputs the information extracted from the vendor region to the vendor region data processing section 83 as vendor region received data.

Furthermore, the CPRI frame processing section 82 acquires monitoring and control information stored in a slow C&M region of the received monitoring and control signal. The CPRI frame processing section 82 outputs the monitoring and control information acquired from the slow C&M region to the slow C&M region data processing section 89 as slow C&M received data.

In addition, the CPRI frame processing section 82 stores slow C&M transmitted data outputted from the slow C&M region data processing section 89 in a slow C&M region of a monitoring and control signal frame and generates the monitoring and control signal frame. The CPRI frame processing section 82 outputs the generated monitoring and control signal frame to the optical device 81 as a transmitted monitoring and control signal.

The vendor region data processing section 83 extracts positional information from the vendor region received data outputted from the CPRI frame processing section 82, and outputs the extracted positional information to the positional information processing section 84 as equipment position received data. In addition, the vendor region data processing section 83 extracts slow C&M address information from the vendor region received data outputted from the CPRI frame processing section 82. For example, the vendor region data processing section 83 extracts "Slow C&M Address Information for RE 1", "Slow C&M Address Information for RE 2", "Slow C&M Address Information for RE 3", and "Slow C&M Address Information for RE 4" indicated in FIG. 5. The vendor region data processing section 83 outputs the extracted slow C&M address information to the slow C&M region acquisition section 85 and the vendor region data processing section 86.

On the basis of the equipment position received data outputted from the vendor region data processing section 83, the positional information processing section 84 recognizes the connection position of the RE 31 connected in the daisy-chain fashion. The RE is connected at the first stage and receives, for example, the positional information "0". Accordingly, the positional information processing section 84 recognizes on the basis of the positional information "0" that the RE 31 is connected at the first stage. The positional information processing section 84 outputs the recognized connection position to the slow C&M region acquisition section 85 as connection position information.

In addition, the positional information processing section 84 increments (changes) the equipment position received data (positional information) outputted from the vendor region data processing section 83 By "1" and outputs a value obtained to the vendor region data processing section 86 as equipment position transmitted data. As a result, the RE 32 connected at the next stage receives the positional information "1" and can recognize that the RE 32 is connected at the second stage.

On the basis of the connection position information outputted from the positional information processing section 84, the slow C&M region acquisition section 85 refers to the slow C&M address information outputted from the vendor region data processing section 83, and acquires address information (start address ID and end address ID) for slow C&M regions assigned to the RE 31. On the basis of the acquired address information, the slow C&M region acquisition section 85 refers to the conversion table 91 and acquires addresses of the slow C&M regions assigned to the RE 31. The slow C&M region acquisition section 85 outputs the acquired addresses of the slow C&M regions to the slow C&M region data processing section 89 as slow C&M region assignment information.

As indicated in FIG. 8, the conversion table stores the relationship between a slow C&M region address and address ID.

For example, the RE 31 is connected at the first stage, so the slow C&M region acquisition section 85 acquires the connection position information "0" from the positional information processing section 84. On the basis of the connection position information "0", the slow C&M region acquisition section 85 acquires, for example, "Slow C&M Address Information for RE 1" (address information for the slow C&M regions assigned to the RE 31) in the vendor region indicated in FIG. 5. On the basis of the acquired address information, the slow C&M region acquisition section 85 refers to the conversion table 91 and acquires the addresses of the slow C&M regions assigned to the RE 31. For example, the slow C&M region acquisition section 85 acquires the addresses (Z, 1, 0), (Z, 1, 1), (Z, 1, 2), and (Z, 1, 3). The slow C&M region acquisition section 85 outputs the acquired addresses of the slow C&M regions to the slow C&M region data processing section 89 as slow C&M region assignment information.

The vendor region data processing section 86 outputs equipment position transmitted data outputted from the positional information processing section 84 and the slow C&M address information outputted from the vendor region data processing section 83 to the CPRI frame processing section 87 as vendor region transmitted data to be stored in vendor regions of a monitoring and control signal. That is to say, information stored in the vendor regions of the monitoring and control signal received from the REC 21 is transmitted to the RE 32 at the next stage. However, the positional information is incremented by "1" by the positional information processing section 84.

The CPRI frame processing section 87 stores the vendor region transmitted data outputted from the vendor region data processing section 86 in vendor regions of a monitoring and control signal frame. For example, the CPRI frame processing section 87 stores the vendor region transmitted data in the vendor regions of FIG. 5 corresponding to "Positional Information", "Slow C&M Address Information for RE 1", "Slow C&M Address Information for RE 2", "Slow C&M Address Information for RE 3", and "Slow C&M Address Information for RE 4".

Furthermore, the CPRI frame processing section stores slow C&M next-link transmitted data outputted from the slow C&M region data processing section 89 in a slow C&M region of the monitoring and control signal. That is to say, information stored in the slow C&M region of the monitoring and control signal received from the REC 21 is transmitted to the RE 32 at the next stage.

In addition, the CPRI frame processing section 87 extracts data in a slow C&M region from a next-stage received monitoring and control signal outputted from the optical device 88, and outputs the data to the slow C&M region data processing section 89 as slow C&M next-link received data. That is to say, information stored in the slow C&M region of the monitoring and control signal received from the RE 32 is transmitted to the REC 21 (or RE at the preceding stage).

The CPRI frame processing section 87 generates a next-stage transmitted monitoring and control signal including the vendor region transmitted data outputted from the vendor region data processing section 86, and outputs the next-stage transmitted monitoring and control signal to the optical device 88. In addition, the CPRI frame processing section 87 generates the next-stage transmitted monitoring and control signal including the slow C&M next-link transmitted data outputted from the slow C&M region data processing section 89, and outputs the next-stage transmitted monitoring and control signal to the optical device 88.

The optical device 88 converts the next-stage transmitted monitoring and control signal outputted from the CPRI frame processing section 87 to an optical signal and outputs the optical signal via the optical fiber. In addition, the optical device 88 converts the next-stage received monitoring and control signal received via the optical fiber to an electrical signal and outputs the electrical signal to the CPRI frame processing section 87.

The slow C&M region data processing section 89 outputs the slow C&M received data outputted from the CPRI frame processing section 82 to the CPRI frame processing section 87 as the slow C&M next-link transmitted data in order to transmit the slow C&M received data to the RE 32 at the next stage.

In addition, on the basis of the slow C&M region assignment information outputted from the slow C&M region acquisition section 85, the slow C&M region data processing section 89 acquires monitoring and control information a destination of which is the RE 31 from the slow C&M received data outputted from the CPRI frame processing section 82. The slow C&M region data processing section 89 outputs the acquired monitoring and control information in slow C&M regions to the monitoring and control section 90 as slow C&M received information.

For example, if the addresses (Z, 1, 0), (Z, 1, 1), (Z, 1, 2), and (Z, 1, 3) are outputted from the slow C&M region acquisition section 85 as the slow C&M region assignment information, then the slow C&M region data processing section 89 refers to slow C&M regions of a monitoring and control signal on the basis of these addresses and acquires monitoring and control information stored in the slow C&M regions. The slow C&M region acquisition section 85 outputs the acquired monitoring and control information in the slow C&M regions to the monitoring and control section 90 as slow C&M received information.

Furthermore, on the basis of the slow C&M region assignment information outputted from the slow C&M region acquisition section 85, the slow C&M region data processing section 89 assigns slow C&M transmitted information (monitoring and control information regarding RE 31) outputted from the monitoring and control section 90 to slow C&M regions.

For example, if the addresses (Z, 1, 0), (Z, 1, 1), (Z, 1, 2), and (Z, 1, 3) are outputted from the slow C&M region acquisition section 85 as the slow C&M region assignment information, then the slow C&M region data processing section 89 assigns slow C&M transmitted information to the slow C&M regions at these addresses.

The slow C&M region data processing section 89 outputs the slow C&M transmitted information assigned to addresses outputted as the slow C&M region assignment information and the slow C&M next-link received data outputted from the CPRI frame processing section 87 to the CPRI frame processing section 82 as slow C&M transmitted data.

The monitoring and control section 90 receives the slow C&M received information outputted from the slow C&M region data processing section 89. That is to say, the monitoring and control section 90 receives the monitoring and control information which is transmitted from the REC 21 and a destination of which is the RE 31. When the monitoring and control section 90 receives the monitoring and control information from the REC 21, the monitoring and control section 90 performs various monitoring and control processes on the basis of the received monitoring and control information. The monitoring and control section 90 outputs the result of performing a monitoring and control process on the RE 31 to the slow C&M region data processing section 89 as the slow C&M transmitted information (monitoring and control information).

Figure 12:
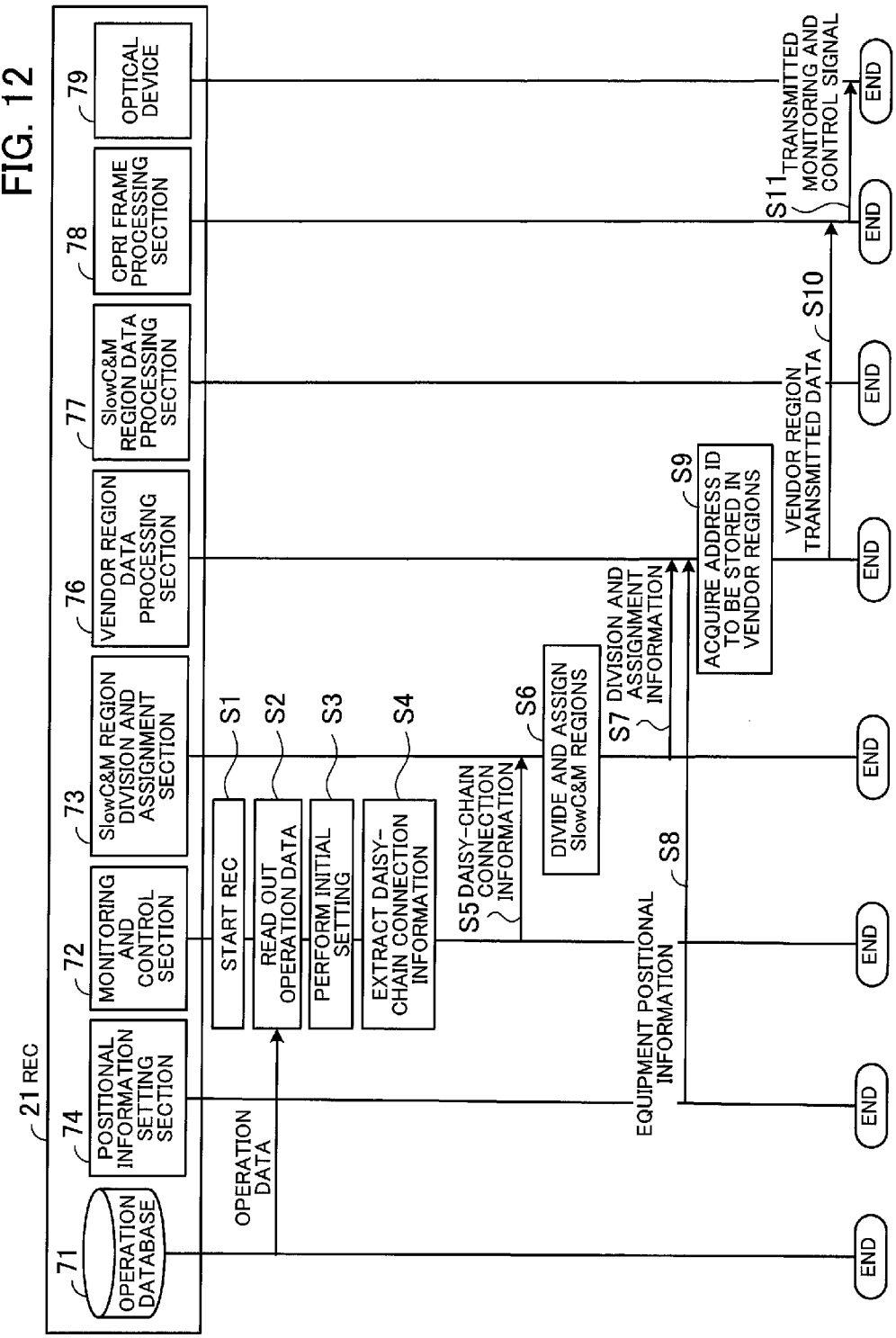
FIG. 12 is a sequence diagram of a slow C&M region division process performed by the REC.

FIG. 12 is a sequence diagram of a slow C&M region division process performed by the REC. By performing the following steps, the REC 12 divides slow C&M regions used for transmitting monitoring and control information to and receiving monitoring and control information from the REs 31 through 34, assigns the slow C&M regions to the REs 31 through 34, and transmits information regarding the assignment to the REs 31 through 34.

(Step S1) The monitoring and control section 72 starts the REC 21 by, for example, turning on power.

(Step S2) The monitoring and control section 72 reads out operation data from the operation database 71. The operation data includes not only initial setting information for the REC 21 but also daisy-chain connection information.

(Step S3) The monitoring and control section 72 performs an initial setting for the REC 21 on the basis of the initial setting information included in the operation data.

(Step S4) The monitoring and control section 72 extracts the daisy-chain connection information from the operation data.

(Step S5) The monitoring and control section 72 outputs the daisy-chain connection information extracted from the operation data to the slow C&M region division and assignment section 73.

(Step S6) The slow C&M region division and assignment section 73 divides the slow C&M regions on the basis of the daisy-chain connection information and assigns the slow C&M regions after the division to the REs 31 through 34.

(Step S7) The slow C&M region division and assignment section 73 outputs the result of dividing and assigning the slow C&M regions to the vendor region data processing section 76 as division and assignment information for the slow C&M regions.

(Step S8) The positional information setting section 74 outputs equipment positional information to the vendor region data processing section 76. The equipment positional information is positional information used by each of the REs 31 through 34 for recognizing its connection position, and is, for example, "0".

(Step S9) The vendor region data processing section 76 refers to the conversion table 75 on the basis of the division and assignment information outputted from the slow C&M region division and assignment section 73, and acquires address ID to be stored in vendor regions of a monitoring and control signal. That is to say, the vendor region data processing section 76 acquires address ID for the slow C&M regions assigned to the REs 31 through 34.

(Step S10) The vendor region data processing section 76 outputs the acquired address ID and the equipment positional information received from the positional information setting section 74 to the CPRI frame processing section 78 as vendor region transmitted data.

(Step S11) The CPRI frame processing section 78 stores the address ID for the slow C&M regions assigned to the REs 31 through 34 which is included in the vendor region transmitted data outputted from the vendor region data processing section 76 in the vendor regions of the monitoring and control signal. In addition, the CPRI frame processing section 78 stores the equipment positional information included in the vendor region transmitted data outputted from the vendor region data processing section 76 in a vendor region. The CPRI frame processing section 78 outputs a transmitted monitoring and control signal in which the vendor region transmitted data is stored in the vendor regions to the optical device 79. The optical device 79 converts the transmitted monitoring and control signal to an optical signal and transmits the optical signal to the RE 31 via the optical fiber.

Figure 13:
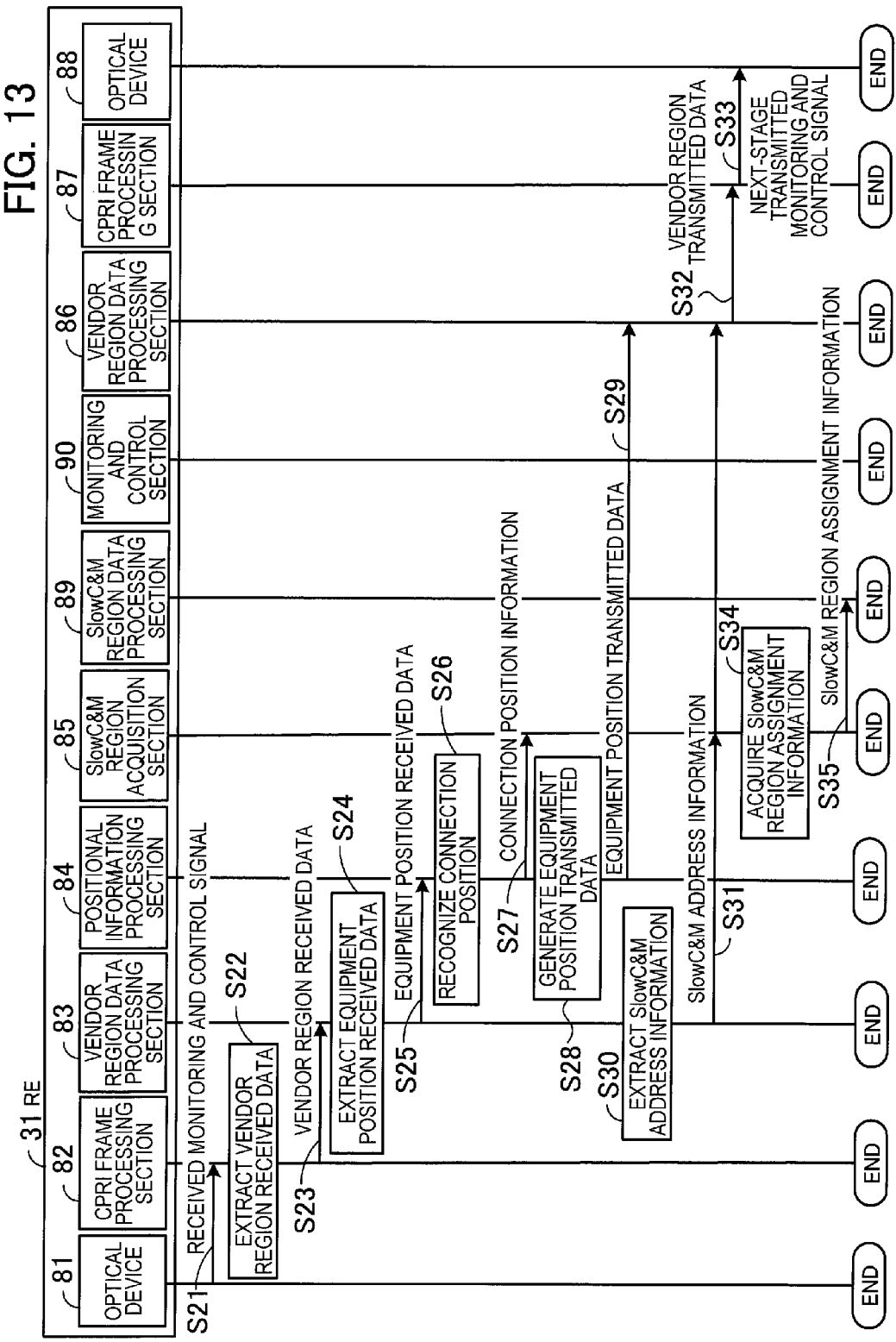
FIG. 13 is a sequence diagram of a slow C&M region assignment information receiving process performed by RE.

FIG. 13 is a sequence diagram of a slow C&M region assignment information receiving process performed by RE. FIG. 13 illustrates the sequence executed by the RE 31. By performing the following steps, the RE 31 acquires information regarding address of slow C&M regions assigned thereto and transmits the information to the REs 32 through 34 at the following stages.

(Step S21) The optical device 81 receives a monitoring and control signal via the optical fiber, converts the received monitoring and control signal to an electrical signal, and outputs the electrical signal to the CPRI frame processing section 82.

(Step S22) The CPRI frame processing section 82 extracts information (vendor region received data) stored in vendor regions of the received monitoring and control signal. Address information for slow C&M regions assigned to the REs 31 through 34 and positional information used by each of the REs 31 through 34 for recognizing its connection position are stored in the vendor regions of the received monitoring and control signal.

(Step S23) The CPRI frame processing section 82 outputs the extracted vendor region received data to the vendor region data processing section 83.

(Step S24) The vendor region data processing section 83 extracts equipment position received data (positional information) from the vendor region received data received from the CPRI frame processing section 82.

(Step S25) The vendor region data processing section 83 outputs the extracted equipment position received data to the positional information processing section 84.

(Step S26) On the basis of the equipment position received data outputted from the vendor region data processing section 83, the positional information processing section 84 recognizes the connection position of the RE 31 connected to the REC 21 in the daisy-chain fashion. For example, if the equipment position received data is "0", then the positional information processing section 84 recognizes that the RE 31 is connected at the first stage from the REC 21.

(Step S27) The positional information processing section 84 outputs the recognized connection position to the slow C&M region acquisition section 85 as connection position information.

(Step S28) The positional information processing section 84 generates equipment position transmitted data by incrementing the equipment position received data outputted from the vendor region data processing section 83 by "1". The equipment position transmitted data (positional information) generated by incrementing the equipment position received data by "1" is transmitted to the RE 32 at the next stage. As a result, the RE 32 can recognize that the RE 32 is connected at the second stage from the REC 21.

(Step S29) The positional information processing section 84 outputs the generated equipment position transmitted data to the vendor region data processing section 86.

(Step S30) The vendor region data processing section 83 extracts slow C&M address information from the vendor region received data received from the CPRI frame processing section 82. For example, the vendor region data processing section 83 extracts "Slow C&M Address Information for RE 1", "Slow C&M Address Information for RE 2", "Slow C&M Address Information for RE 3", and "Slow C&M Address Information for RE 4" indicated in FIG. 5.

(Step S31) The vendor region data processing section 83 outputs the extracted slow C&M address information to the slow C&M region acquisition section 85 and the vendor region data processing section 86.

(Step S32) The vendor region data processing section 86 outputs the equipment position transmitted data outputted from the positional information processing section 84 and the slow C&M address information outputted from the vendor region data processing section 83 to the CPRI frame processing section 87 as vendor region transmitted data to be stored in the vendor regions of the monitoring and control signal. That is to say, assignment information for slow C&M regions assigned to the REs 31 through 34 by the REC 21 and positional information obtained by incrementing by "1" are stored in the vendor regions of the monitoring and control signal and are transmitted to the RE 32 at the next stage.

(Step S33) The CPRI frame processing section 87 stores the vendor region transmitted data outputted from the vendor region data processing section 86 in the vendor regions of the monitoring and control signal and outputs the vendor region transmitted data to the optical device 88 as a next-stage transmitted monitoring and control signal. The optical device 88 converts the next-stage transmitted monitoring and control signal to an optical signal and transmits the optical signal to the RE 32 at the next stage via the optical fiber.

(Step S34) On the basis of the connection position information outputted from the positional information processing section 84, the slow C&M region acquisition section 85 refers to the slow C&M address information outputted from the vendor region data processing section 83, and acquires address information for slow C&M regions assigned to the RE 31. For example, the slow C&M region acquisition section 85 acquires "Slow C&M Address Information for RE 1" in the vendor region of FIG. 5 on the basis of the connection position information "0". On the basis of the acquired address information (address ID), the slow C&M region acquisition section 85 refers to the conversion table 91 and acquires addresses of the slow C&M regions assigned to the RE 31.

(Step S35) The slow C&M region acquisition section 85 outputs the acquired addresses to the slow C&M region data processing section 89 as slow C&M region assignment information.

Figure 14:
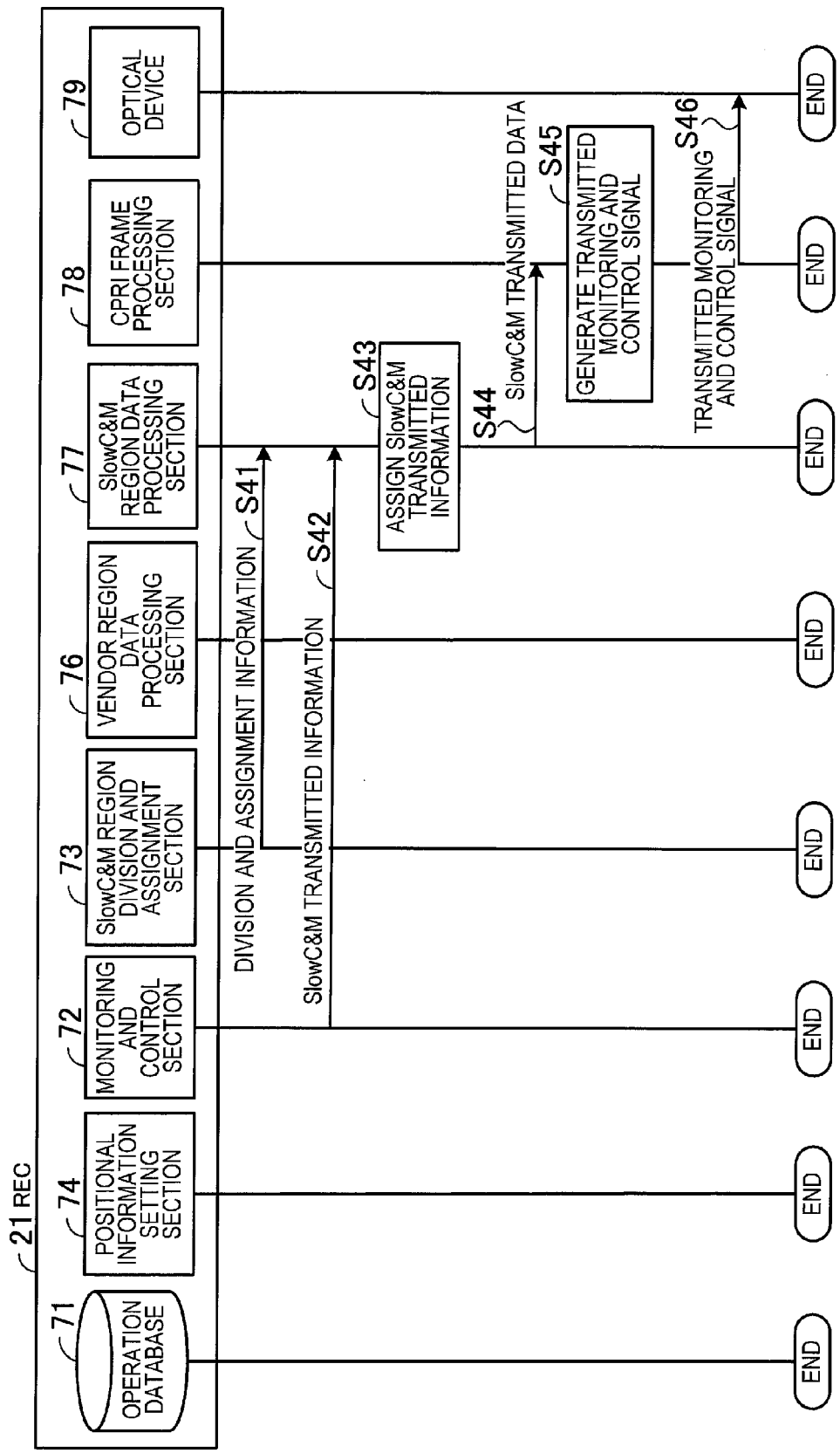
FIG. 14 is a sequence diagram of a monitoring and control information transmission process performed by the REC.

FIG. 14 is a sequence diagram of a monitoring and control information transmission process performed by the REC. By performing the following steps, the REC 21 assigns monitoring and control information to be transmitted to the REs 31 through 34 to slow C&M regions, and transmits the monitoring and control information to the REs 31 through 34.

(Step S41) The slow C&M region division and assignment section 73 outputs division and assignment information for slow C&M regions assigned to the REs 31 through 34 to the slow C&M region data processing section 77.

(Step S42) The monitoring and control section 72 outputs monitoring and control information to be transmitted to the REs 31 through 34 to the slow C&M region data processing section 77 as slow C&M transmitted information.

(Step S43) On the basis of the division and assignment information outputted from the slow C&M region division and assignment section 73, the slow C&M region data processing section 77 assigns the slow C&M transmitted information outputted from the monitoring and control section 72 to the slow C&M regions of a monitoring and control signal.

(Step S44) The slow C&M region data processing section 77 outputs the slow C&M transmitted information assigned to the slow C&M regions to the CPRI frame processing section 78 as slow C&M transmitted data.

(Step S45) The CPRI frame processing section 78 stores the slow C&M transmitted data outputted from the slow C&M region data processing section 77 in the slow C&M regions of the monitoring and control signal and generates a transmitted monitoring and control signal.

(Step S46) The CPRI frame processing section 78 outputs the generated transmitted monitoring and control signal to the optical device 79. The optical device 79 converts the transmitted monitoring and control signal to an optical signal and outputs the optical signal to the RE 31 via the optical fiber.

Figure 15:
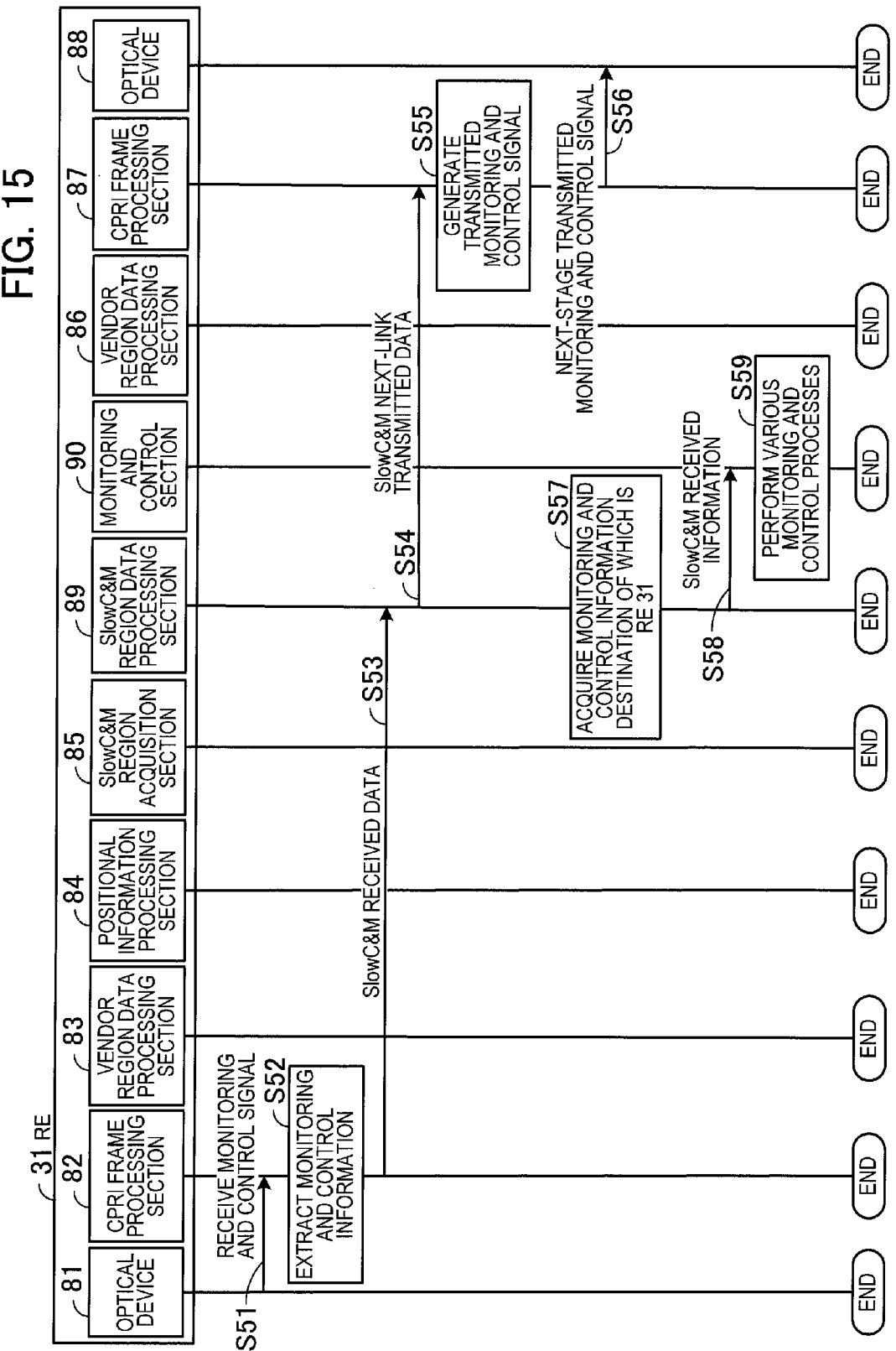
FIG. 15 is a sequence diagram of a monitoring and control information receiving process performed by RE.

FIG. 15 is a sequence diagram of a monitoring and control information receiving process performed by RE. By performing the following steps, the RE 31 receives monitoring and control information transmitted from the REC 21, and acquires monitoring and control information a destination of which is the RE 31. In addition, the RE 31 transmits the received monitoring and control information to the RE 32 at the next stage.

(Step S51) The optical device 81 receives a monitoring and control signal via the optical fiber, converts the received monitoring and control signal to an electrical signal, and outputs the electrical signal to the CPRI frame processing section 82.

(Step S52) The CPRI frame processing section 82 acquires monitoring and control information stored in slow C&M regions of the received monitoring and control signal.

(Step S53) The CPRI frame processing section 82 outputs the acquired monitoring and control information in the slow C&M regions to the slow C&M region data processing section 89 as slow C&M received data.

(Step S54) The slow C&M region data processing section 89 outputs the slow C&M received data outputted from the CPRI frame processing section 82 to the CPRI frame processing section 87 as slow C&M next-link transmitted data in order to transmit the slow C&M received data to the RE 32 at the next stage.

(Step S55) The CPRI frame processing section 87 stores the slow C&M next-link transmitted data outputted from the slow C&M region data processing section 89 in the slow C&M regions of the monitoring and control signal and generates a next-stage transmitted monitoring and control signal.

(Step S56) The CPRI frame processing section 87 outputs the generated next-stage transmitted monitoring and control signal to the optical device 88. The optical device 88 converts the next-stage transmitted monitoring and control signal to an optical signal and transmits the optical signal to the RE 32 at the next stage via the optical fiber.

(Step S57) On the basis of slow C&M region assignment information acquired by the slow C&M region acquisition section 85 (step S35 of FIG. 13), the slow C&M region data processing section 89 acquires monitoring and control information a destination of which is the RE 31 from the slow C&M received data outputted from the CPRI frame processing section 82.

(Step S58) The slow C&M region data processing section 89 outputs the acquired monitoring and control information in a slow C&M region to the monitoring and control section 90 as slow C&M received information.

(Step S59) When the monitoring and control section 90 receives the monitoring and control information from the REC 21, the monitoring and control section 90 performs various monitoring and control processes on the basis of the received monitoring and control information.

Figure 16:
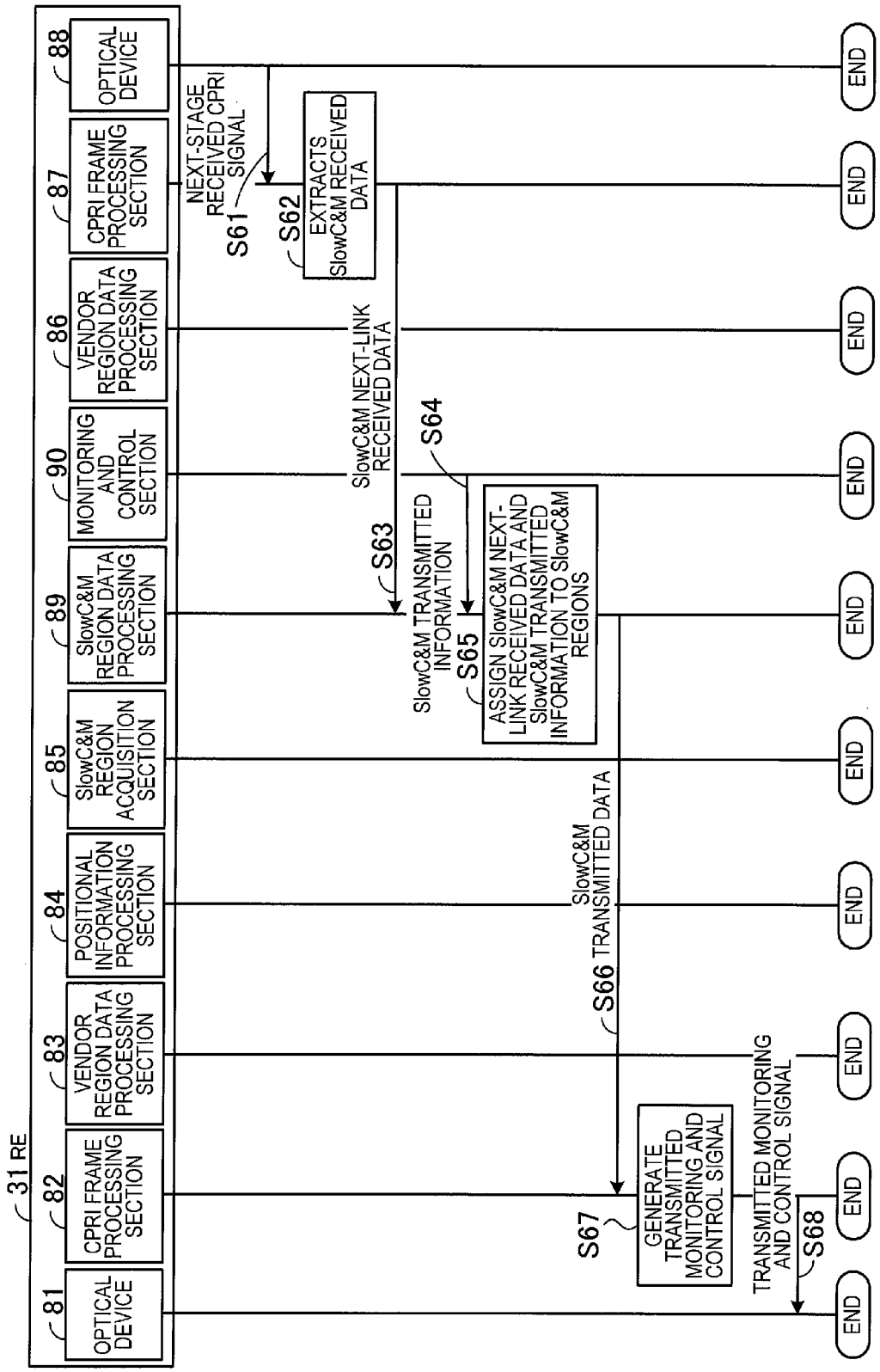
FIG. 16 is a sequence diagram of a monitoring and control information transmission process performed by RE.

FIG. 16 is a sequence diagram of a monitoring and control information transmission process performed by RE. By performing the following steps, the RE 31 receives a monitoring and control signal including monitoring and control information from the RE 32 at the next stage and outputs the monitoring and control signal including monitoring and control information regarding the RE 31 to the REC 21 (or RE at the preceding stage).

(Step S61) The optical device 88 receives a monitoring and control signal from the RE 32 at the next stage via the optical fiber, converts the next-stage received monitoring and control signal to an electrical signal, and outputs the electrical signal to the CPRI frame processing section 87.

(Step S62) The CPRI frame processing section 87 extracts data from slow C&M regions of the next-stage received monitoring and control signal outputted from the optical device 88.

(Step S63) The CPRI frame processing section 87 outputs the data extracted from the slow C&M regions of the next-stage received monitoring and control signal to the slow C&M region data processing section 89 as slow C&M next-link received data.

(Step S64) The monitoring and control section 90 outputs monitoring and control information regarding the RE 31 to the slow C&M region data processing section 89 as slow C&M transmitted information.

(Step S65) On the basis of slow C&M region assignment information acquired by the slow C&M region acquisition section 85 (step S35 of FIG. 13), the slow C&M region data processing section 89 assigns the slow C&M next-link received data outputted from the CPRI frame processing section 87 and the slow C&M transmitted information outputted from the monitoring and control section 90 to slow C&M regions.

(Step S66) The slow C&M region data processing section 89 outputs the slow C&M next-link received data and the slow C&M transmitted information assigned to the slow C&M regions to the CPRI frame processing section 82 as slow C&M transmitted data.

(Step S67) The CPRI frame processing section 82 stores the slow C&M transmitted data outputted from the slow C&M region data processing section 89 in the slow C&M regions of the monitoring and control signal and generates a transmitted monitoring and control signal.

(Step S68) The CPRI frame processing section 82 outputs the generated transmitted monitoring and control signal to the optical device 81. The optical device 81 converts the transmitted monitoring and control signal to an optical signal and outputs the optical signal to the REC 21 via the optical fiber.

Figure 17:
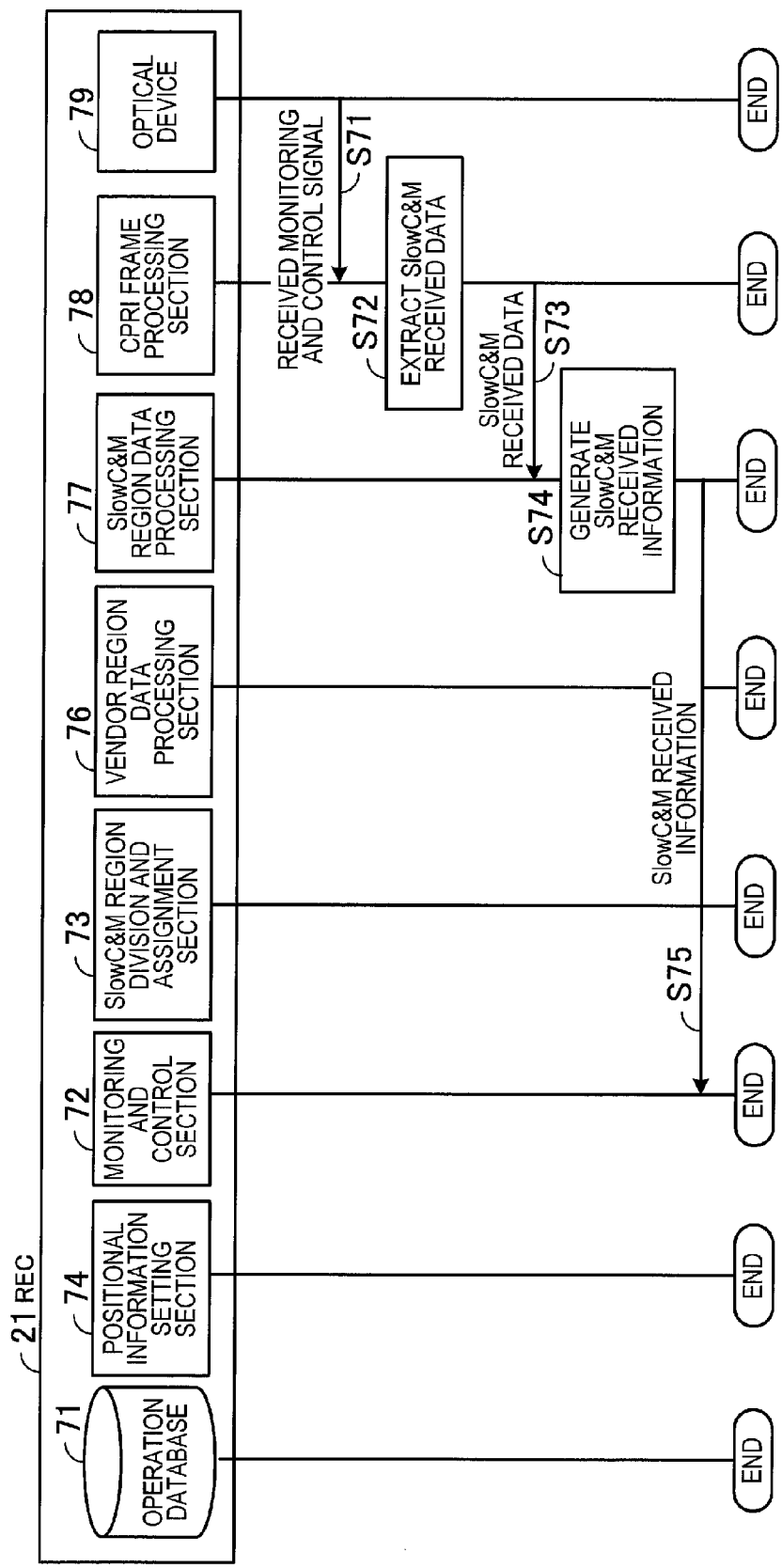
FIG. 17 is a sequence diagram of a monitoring and control information receiving process performed by the REC.

FIG. 17 is a sequence diagram of a monitoring and control information receiving process performed by the REC. By performing the following steps, the REC 21 receives a monitoring and control signal including monitoring and control information regarding the REs 31 through 34.

(Step S71) The optical device 79 receives a monitoring and control signal from the RE 31 via the optical fiber, converts the received monitoring and control signal to an electrical signal, and outputs the electrical signal to the CPRI frame processing section 78.

(Step S72) The CPRI frame processing section 78 extracts slow C&M received data from slow C&M regions of the received monitoring and control signal. That is to say, the CPRI frame processing section 78 extracts monitoring and control information regarding the REs 31 through 34 stored in the slow C&M regions.

(Step S73) The CPRI frame processing section 78 outputs the extracted slow C&M received data to the slow C&M region data processing section 77.

(Step S74) On the basis of division and assignment information outputted from the slow C&M region division and assignment section 73 (step S7 of FIG. 12), the slow C&M region data processing section 77 understands which of the REs 31 through 34 transmits the slow C&M received data outputted from the CPRI frame processing section 78, and generates slow C&M received information (monitoring and control information).

(Step S75) The slow C&M region data processing section 77 outputs the slow C&M received information regarding the REs 31 through 34 to the monitoring and control section 72.

As has been described, the REC 21 divides slow C&M regions of a monitoring and control signal and assigns the slow C&M regions to the REs 31 through 34. This prevents the REs 31 through 34 from occupying all of the slow C&M regions, so communication between the REC 21 and the REs 31 through 34 can be ensured.

In addition, the REs 31 through 34 transmit monitoring and control information to or receive monitoring and control information from the REC 21 by the use of the slow C&M regions assigned thereto by the REC 21. This prevents the REs 31 through 34 from occupying all of the slow C&M regions, so communication between the REC 21 and the REs 31 through 34 can be ensured.

Furthermore, the REs 31 through 34 recognize their connection positions by positional information. As a result, additional RE can be connected.

Moreover, link connection of a vendor region of a monitoring and control signal is established earlier than link connection of a slow C&M region of the monitoring and control signal. Therefore, it is possible to transmit assignment information for slow C&M regions to the REs 31 through 34 before link connection of the slow C&M regions by transmitting address information for the slow C&M regions by the use of vendor regions.

The description of a slow C&M region has been given. However, communication can also be performed in the same way by assigning fast C&M regions to the REs 31 through 34.

Furthermore, in the above description the number of slow C&M regions is 16. However, the number of slow C&M regions is not limited to 16. The number of slow C&M regions can be changed by changing the number of lines in a basic frame.

In addition, slow C&M regions are divided evenly and are assigned to the REs 31 through 34. However, another division method may be adopted. For example, many slow C&M regions may be assigned to one of the REs 31 through 34 which needs to transmit or receive a large amount of monitoring and control information.

Figure 18:
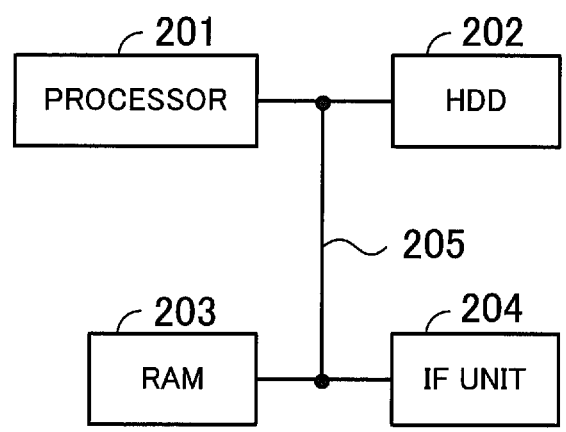
FIG. 18 illustrates an example of a hardware configuration of an REC.

FIG. 18 illustrates an example of a hardware configuration of an REC. As illustrated in FIG. 18, an REC includes a processor 201, a Hard Disk Drive (HDD) 202, a Random Access Memory (203), interface (IF) unit 204, and a bus 205. The REC is entirely controlled by the processor 201. The HDD 202, RAM 203, and interface unit 204 are connected to the processor 201 via the bus 205.

The processor 201 may be a Central Processing Unit (CPU) or Digital Signal Processor (DSP), for example. The HDD 202 is, for example, used as secondary storage, and stores Operating System (OS) programs, application programs, and various data. As the secondary storage, a semiconductor storage device such as a flash memory may be used instead.

The RAM 203 temporarily stores part or all of the OS and application programs to be executed by the processor 201. The RAM 203 also stores various data to be used while the processor 201 executes the programs. The interface unit 204 performs data communication with another apparatus, and may be an optical device, for example. An RE may have the same hardware configuration as illustrated in FIG. 18.

The division and assignment section 1*a*, transmission section 1*b*, receiving section 2*a*, position recognition section 2*b*, and acquisition section 2*c* illustrated in FIG. 1 may be realized, for example, by the processor 201. In addition, an interface for transmitting and receiving information from/to the transmission section 1*b* and receiving section 2*a* are realized, for example, by the interface unit 204.

The monitoring and control section 72, slow C&M region division and assignment section 73, positional information setting section 74, vendor region data processing section 76, slow C&M region data processing section 77, and CPRI frame processing section 78 illustrated in FIG. 10 are realized, for example, by the processor 201. In addition, the operation database 71 and conversion table 75 are realized by a storage device such as the RAM 203 or HDD 202. The optical device 79 is realized, for example, by the interface unit 204.

The CPRI frame processing section 82, vendor region data processing section 83, positional information processing section 84, slow C&M region acquisition section 85, vendor region data processing section 86, CPRI frame processing section 87, slow C&M region data processing section 89, and monitoring and control section 90 illustrated in FIG. 11 are realized, for example, by the processor 201. The conversion table 91 is realized, for example, by a storage device such as the RAM 203 or HDD 202. The optical devices 81 and 88 are realized, for example, the interface unit 204.

According to the disclosed radio equipment controller, radio equipment, and communication method, communication can be ensured between the radio equipment controller and the radio equipment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A radio equipment controller coupled to at least first radio equipment and second radio equipment in a base station via daisy-chain links of Common Public Radio Interface (CPRI), the radio equipment controller comprising:
   a processor which manages usage of control words of slow Command and Management (C&M) subchannel and first and second control words of vendor specific subchannel in CPRI hyperframes by performing a procedure including:
   dividing previously the control words of slow C&M subchannel in a predetermined number of CPRI hyperframes into at least a first group of slow C&M control words and a second group of slow C&M control words, and
   assigning the first group of slow C&M control words and the first control word of vendor specific subchannel to the first radio equipment, and the second group of slow C&M control words and the second control word of vendor specific subchannel to the second radio equipment; and
   a transmitter which transmits first address information to the first radio equipment by using the first control word of the vendor specific subchannel to specify in which part of the CPRI hyperframes the first group of C&M control words are located, and transmits second address information to the second radio equipment by using the second control word of the vendor specific subchannel to specify in which part of the CPRI hyperframes the second group of C&M control words are located.

2. The radio equipment controller according to claim 1, wherein the transmitter transmits positional information by using a third control word of vendor specific subchannel to inform the first radio equipment and second radio equipment of connection positions thereof in the daisy-chain links of CPRI.

3. The radio equipment controller according to claim 2, wherein the transmitter transmits the positional information to cause the first radio equipment to acquire the first address information, and the second radio equipment to acquire the second address information.

4. The radio equipment controller according to claim 1, wherein the radio equipment controller is coupled to three or more radio equipments, and the processor divides the control words of slow C&M subchannel into as many croups as the number of radio equipments.

5. The radio equipment controller according to claim 1, wherein the transmitter transmits first slow C&M data for the first radio equipment by using the first group of slow C&M control words in the CPRI hvperframe, and second slow C&M data for the second radio equipment by using the second group of slow C&M control words in the CPRI hvperframe.

6. The radio equipment controller according to claim 1, wherein a link with the vendor specific subchannel is established earlier than a link with the slow C&M subchannel.

7. A radio equipment coupled to a radio equipment controller and other radio equipment in a base station via daisy-chain links of Common Public Radio Interface (CPRI), the radio equipment comprising:
   a receiver which receives CPRI hyperframes from the radio equipment controller, the CPRI hyperframes containing at least a first group of slow Command and Management (C&M) control words and a second group of slow C&M control words previously defined by the radio equipment controller, and first, second, and third control words of vendor specific subchannel; and a processor which executes a procedure including:

recognizing a connection position of the radio equipment in the daisy-chain links of CPRI, based on positional information included in the third control word of vendor specific subchannel received by the receiver, acquiring address information from either the first control word of vendor specific subchannel or the second control word of vendor specific subchannel in the received CPRI hyperframes, depending on the connection position recognized from the third control word of vendor specific subchannel, and using either the first group of slow C&M control words or the second group of C&M control words, depending on the acquired address information, to transmit slow C&M data to or receive slow C&M data from the radio equipment controller.

8. The radio equipment according to claim 7, wherein the processor changes the positional information included in the third control word of vendor specific subchannel when forwarding the CPRI hyperframes to the other radio equipment positioned at a next stage in the daisy-chain links of CPRI so that the other radio equipment at the next stage can recognize a connection position thereof.

9. A communication method executed by a radio equipment controller coupled to at least first radio equipment and second radio equipment in a base station via daisy-chain links of Common Public Radio Interface (CPRI), the method comprising:

managing usage of control words of slow Command and Management (C&M) subchannel and first and second control words of vendor specific subchannel in CPRI hyperframes;

dividing previously the control words of slow C&M subchannel in a predetermined number of CPRI hyperframes into at least a first group of slow C&M control words and a second group of slow C&M control words;

assigning the first group of slow C&M control words and the first control word of vendor specific subchannel to the first radio equipment, and the second group of slow C&M control words and the second control word of vendor specific subchannel to the second radio equipment; and transmitting first address information to the first radio equipment by using the first control word of the vendor specific subchannel to specify in which part of the CPRI hyperframes the first group of C&M control words are located, and transmitting second address information to the second radio equipment by using the second control word of the vendor specific subchannel to specify in which part of the CPRI hyperframes the second group of C&M control words are located.

10. A communication method executed by a radio equipment coupled to a radio equipment controller and other radio equipment in a base station via daisy-chain links of Common Public Radio Interface (CPRI), the method comprising:

receiving CPRI hyperframes from the radio equipment controller, the CPRI hyperframes containing at least a first group of slow Command and Management (C&M) control words and a second group of slow C&M control words previously defined by the radio equipment controller, and first, second, and third control words of vendor specific subchannel; and recognizing a connection position of the radio equipment in the daisy-chain links of CPRI, based on positional information included in the third control word of vendor specific subchannel of the received hyperframed;

acquiring address information from either the first control word of vendor specific subchannel or the second control word of vendor specific subchannel in the received CPRI hyperframes, depending on the connection position recognized from the third control word of vendor specific subchannel; and using either the first group of slow C&M control words or the second group of C&M control words, depending on the acquired address information, to transmit slow C&M data to or receive slow C&M data from the radio equipment controller.

* * * * *